United States Patent
Sonoura et al.

(10) Patent No.: US 12,195,315 B2
(45) Date of Patent: Jan. 14, 2025

(54) UNMANNED TRANSPORT VEHICLE, UNMANNED TRANSPORT METHOD, AND COMPUTER-READABLE STORAGE MEDIUM

(71) Applicant: Kabushiki Kaisha Toshiba, Tokyo (JP)

(72) Inventors: Takafumi Sonoura, Yokohama (JP); Daisuke Yamamoto, Kawasaki (JP); Hideki Ogawa, Shinagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 407 days.

(21) Appl. No.: 17/446,182

(22) Filed: Aug. 27, 2021

(65) Prior Publication Data

US 2022/0297992 A1 Sep. 22, 2022

(30) Foreign Application Priority Data

Mar. 22, 2021 (JP) .................. 2021-047512

(51) Int. Cl.
*B66F 7/00* (2006.01)
*B66F 9/06* (2006.01)
*B66F 9/075* (2006.01)
*G01S 17/08* (2006.01)
*G05D 1/00* (2006.01)

(52) U.S. Cl.
CPC ............ *B66F 9/063* (2013.01); *B66F 9/0755* (2013.01); *G01S 17/08* (2013.01); *G05D 1/0225* (2013.01)

(58) Field of Classification Search
CPC ........ B66F 9/063; B66F 9/0755; G01S 17/08; G05D 1/0225; G05D 2201/0216
USPC ............................................................ 701/23
See application file for complete search history.

(56) References Cited

U.S. PATENT DOCUMENTS

| | | |
|---|---|---|
| 2012/0029697 A1 | 2/2012 | Ota et al. |
| 2019/0202388 A1* | 7/2019 | Sonoura ................. B60R 19/40 |
| 2019/0243374 A1 | 8/2019 | Ikawa et al. |
| 2020/0150664 A1 | 5/2020 | Sonoura et al. |
| 2020/0307667 A1* | 10/2020 | Tang ....................... B62D 63/02 |

(Continued)

FOREIGN PATENT DOCUMENTS

| | | | |
|---|---|---|---|
| CN | 107272694 A * | 10/2017 | ........... G05D 1/0214 |
| JP | 5-112237 A | 5/1993 | |

(Continued)

*Primary Examiner* — Tiffany P Young
(74) *Attorney, Agent, or Firm* — Oblon, McClelland, Maier & Neustadt, L.L.P.

(57) ABSTRACT

According to one embodiment, an unmanned transport vehicle includes: a moving body capable of autonomously traveling on a floor surface and having a docking portion connecting to the object; a detection sensor capable of detecting an approach side support leg, wherein, of the plurality of support legs in the object, a pair of support legs located on a docking side of the moving body are designated as approach side support legs, and a pair of support legs located on a side opposite to a docking side in a traveling direction of the moving body is used as depth side support legs; and a control device connected to the moving body and a first detection sensor. The moving body has a height capable of entering a bottom space surrounded by a lower surface of the load plate of the object, the plurality of support legs, and the floor surface.

13 Claims, 15 Drawing Sheets

(56) References Cited

U.S. PATENT DOCUMENTS

2021/0061629 A1 3/2021 Ogawa et al.
2021/0302976 A1* 9/2021 Jazayeri ................. G05D 1/024

FOREIGN PATENT DOCUMENTS

| JP | 2012-035077 A | 2/2012 | |
|---|---|---|---|
| JP | 2019-119343 A | 7/2019 | |
| JP | 2019-131392 A | 8/2019 | |
| JP | 2020-077295 A | 5/2020 | |
| JP | 2021-037776 A | 3/2021 | |
| JP | 2021-071855 A | 5/2021 | |
| WO | WO-2021087312 A1 * | 5/2021 | ........... B65D 19/385 |

* cited by examiner

UNMANNED TRANSPORT VEHICLE, UNMANNED TRANSPORT METHOD, AND COMPUTER-READABLE STORAGE MEDIUM

CROSS-REFERENCE TO RELATED APPLICATION

This application is based upon and claims the benefit of priority from Japanese Patent Application No. 2021-047512, filed Mar. 22, 2021; the entire contents of which are incorporated herein by reference.

FIELD

Embodiments described herein relate generally to an unmanned transport vehicle, an unmanned transport method, and a computer-readable storage medium storing program.

BACKGROUND

In the logistics field, there is a demand for labor saving due to labor shortage and cost reduction. There are great expectations for automation in the basket transportation work in distribution warehouses and distribution centers, and labor saving is being achieved by lifting or hooking baskets using unmanned transport vehicles such as AGVs that have been used in factory production lines. In recent years, unguided unmanned transport vehicles with a self-position estimation function have appeared, and the degree of freedom of movement has been greatly improved. Here, an unmanned transport vehicle having a transport function is focused on, and this is referred to as an unmanned transport vehicle.

As mentioned above, unmanned transport vehicles are becoming widespread, but the transportation method is often to modify the environment rather than the unmanned transport vehicle, such as by generally preparing a special basket that matches the shape of the unmanned transport vehicle, or embedding markers such as RF tags or two-dimensional barcodes on the floor, so it is difficult to transport a commercially available standard basket as it is.

One of the reasons is that it is difficult to detect a general-purpose car carriage and generalize the operation control by an unmanned transport vehicle at the time of docking.

In recent years, there is a technique for guiding an unmanned transport vehicle by using "proximity data and navigation data from a wireless communication device" for docking with a caster portion of a wheelchair, which is a docking object.

For example, for the transfer robot Amazon robotics kiva (registered trademark), a dedicated transfer shelf is prepared according to the vehicle height of the robot, and the transfer shelf is accurately installed at a predetermined position in advance and then, by moving the robot while checking the position recognition tag embedded in the floor, accurate docking to the transport shelf is realized.

Generally, in the logistics industry, a general-purpose car carriage called a roll box pallet (RBP) is widely used, and there is a great need for an unmanned transport vehicle that can autonomously detect and transport a car carriage without modifying the car carriage or environmental equipment.

However, in the existing robot system described above, it is necessary to work on the transport target and the moving environment, and it is difficult to detect and dock the car carriage only by preparing the transport vehicle.

Therefore, there is a technique for detecting and docking a car carriage using a camera image and deep learning, but the measurement accuracy of the object to be transported in pixel units by image processing is low, and it is difficult to dock in a position and orientation that is advantageous for transportation.

DETAILED DESCRIPTION

Figure 1:
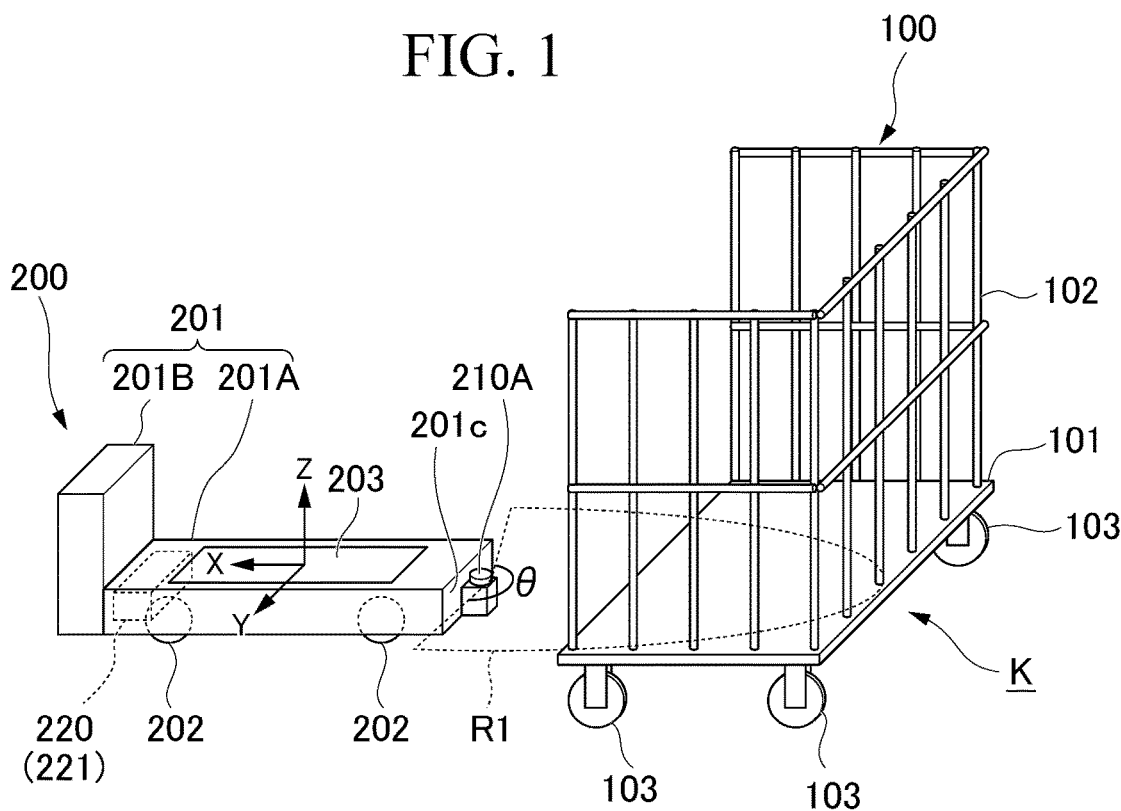
FIG. 1 is a perspective view showing a usage example of an unmanned transport vehicle according to a first embodiment.

One embodiment provides an unmanned transport vehicle, an unmanned transport method, and a computer-readable storage medium storing a program that can be docked in a position and orientation advantageous for transport with respect to a car carriage.

According to one embodiment, an unmanned transport vehicle, capable of transporting an object to be transported including a load plate capable of loading luggage and a plurality of support legs that support at least four corners of the load plate, includes a moving body, a detection sensor, and a control device. The moving body capable of autonomously traveling on a floor surface and having a docking portion configured to connect to the object to be transported. The detection sensor capable of detecting an approach side support leg, wherein, of the plurality of support legs in the object to be transported, a pair of support legs located on a docking side of the moving body are designated as approach side support legs, and a pair of support legs located on a side opposite to a docking side in a traveling direction of the moving body is used as depth side support legs. The control device connected to the moving body and a first detection sensor of the detection sensor. The moving body has a height capable of entering a bottom space surrounded by a lower surface of the load plate of the object to be transported, the plurality of support legs, and the floor surface.

According to one embodiment, an unmanned transport method for an object to be transported by the unmanned transport vehicle, includes: searching for an approach side support leg of the object to be transported by a first detection sensor; detecting, based on a search result by the first detection sensor, a positions of a pair of approach side support legs on the object to be transported, to calculate an approach target reference point, which is a target of an approach position to the object to be transported, and a docking target position, which is a target of a docking position with respect to the object to be transported; stepwise moving the moving body from the approach target reference point to the docking target position; and docking the unmanned transport vehicle with respect to the object to be transported.

According to one embodiment, a computer-readable storage medium storing a program for causing a computer system to execute a process of transporting an object to be transported by the unmanned transport vehicle, includes: searching, by a first detection sensor, for an approach side support leg of the object to be transported; detecting a position of a pair of approach side support legs in the object to be transported, based on a search result by the first detection sensor; calculating an approach target reference point, which is a target of an approach position to the object to be transported, and a docking target position, which is a target of a docking position with respect to the object to be transported; stepwise moving the moving body from the approach target reference point to the docking target position; and docking the unmanned transport vehicle with the object to be transported.

Hereinafter, an unmanned transport vehicle, an unmanned transport method, and a computer-readable storage medium storing a program of embodiments will be described with reference to the drawings. Then, a duplicate description of those configurations may be omitted.

In addition, "based on XX" in the present application means "based on at least XX", and includes a case where it is based on another element in addition to XX. Further, "based on XX" is not limited to the case where XX is directly used, but also includes a case where calculation or processing is performed on XX. "XX" is an arbitrary element (for example, arbitrary information).

In the present application, the X, Y and Z directions of the Cartesian coordinate system are defined as follows. The Z direction is the vertical direction, and the +Z direction is the upward direction. The X direction is the horizontal direction, which is the forward-backward direction of the unmanned transport vehicle, and the +X direction is the forward direction of the unmanned transport vehicle. The Y direction is a horizontal direction, a direction orthogonal to the X direction, and a left-right direction (width direction) of the unmanned transport vehicle.

The unmanned transport vehicle can move at least in the X direction and can turn. The movement direction of the unmanned transport vehicle is not limited to this, and the unmanned transport vehicle may be able to move in all directions such as the movement in the Y direction and a combined direction thereof.

In the present specification, the unmanned transport vehicle is a vehicle that moves the car carriage to another place, and among the unmanned transport vehicles, the direction in which the car carriage is transported (towed) is defined as "forward" and the direction facing the docking car carriage is defined as "backward". In addition, the operation of moving the unmanned transport vehicle toward the car carriage in the −X direction ("backward") is referred to as "approaching operation with respect to the car carriage", and the operation of moving the unmanned transport vehicle in the +X direction ("forward") is referred to as "the operation of transporting (towing) the car carriage".

First Embodiment

Figure 2:
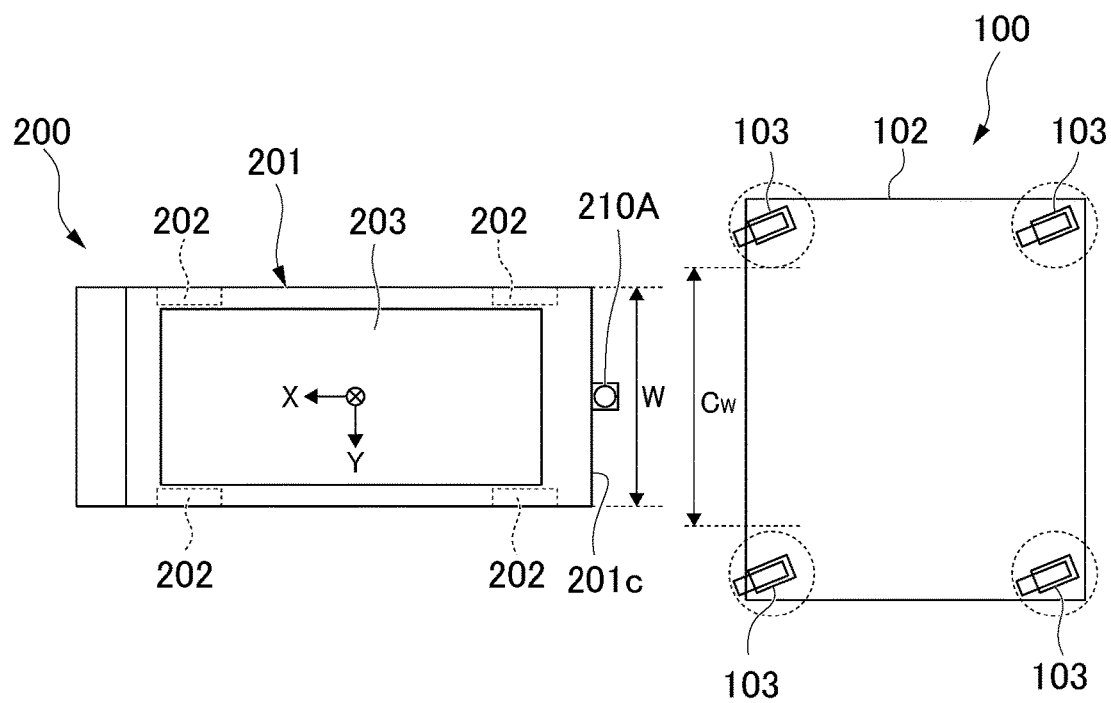
FIG. 2 is a plan view showing the sizes of an unmanned transport vehicle and a car carriage according to the first embodiment.
Figure 3:
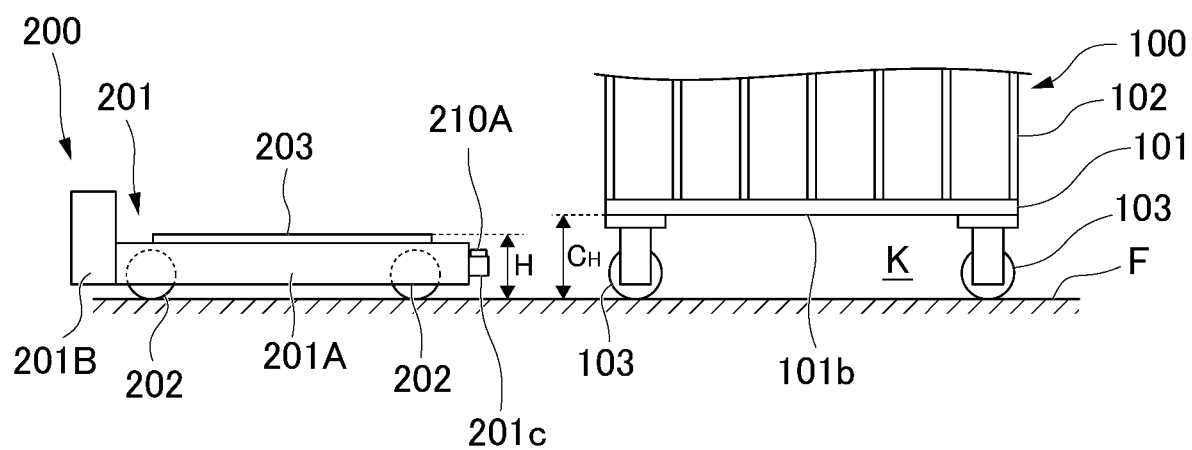
FIG. 3 is a side view showing the size of the unmanned transport vehicle and the car carriage of the first embodiment.

FIG. 1 is a perspective view showing an example of use of the unmanned transport vehicle 200 of the first embodiment. FIG. 2 is a plan view showing the sizes of the unmanned transport vehicle and the car carriage of the first embodiment. FIG. 3 is a side view showing the sizes of an unmanned transport vehicle and a car carriage of the first embodiment.

The unmanned transport vehicle 200 of the present embodiment is, for example, a lineless type autonomous vehicle that does not need to be operated by an operator and does not require a line drawn on a floor surface. The unmanned transport vehicle 200 is, for example, a low-floor type vehicle, which sneaks under the car carriage 100 and is coupled (docked) to the car carriage 100 to transport the car carriage 100 to another location.

However, the unmanned transport vehicle 200 in the present invention is not limited to the above example, and may be another type of unmanned transport vehicle. For example, the unmanned transport vehicle 200 may be an unmanned transport vehicle whose autonomous moving portion other than the docking operation is operated by an operator.

First, the configuration of the car carriage (transport target) 100, which is the transport target of the unmanned transport vehicle 200, will be described.

The configuration of the car carriage 100 shown in FIG. 1 is an example.

The car carriage 100 includes a load plate 101 capable of loading cargo, a frame member 102 that rises vertically from the four sides of the load plate 101, and four casters (support legs) 103 provided at the four corners on the lower surface 101*b* side of the load plate 101.

The four casters 103 are all swivelable casters, and enable the car carriage 100 to move in all directions. In FIG. 2, the turning range of each caster 103 is indicated by a chain line.

At least two of the four casters 103 may be of a type capable of appropriately switching between swivel and swivel shaft fixation. Further, all four casters 103 may be swivel shaft fixed casters.

As shown in FIGS. 1 and 3, below the car carriage 100, there is a floor surface F, four casters 103, and a bottom space K surrounded by the lower surface 101*b* of the load plate 101. The unmanned transport vehicle 200 enters the bottom space K.

Next, the configuration of the unmanned transport vehicle 200 in the first embodiment will be described in detail.

The unmanned transport vehicle 200 includes a transport vehicle body (moving body) 201, a plurality of wheels 202, a plurality of wheel drive motors (not shown) for driving each wheel 202, and a first detection sensor (detection sensor) 210A, and a control device 220.

In the present embodiment, the control device 220 mainly comprises a computer system having a processor and a memory. The function of the control device 220 is realized by the processor of the computer system executing the transfer program according to the present invention recorded in the memory of the computer system. The transport program may be recorded in a memory, provided through a telecommunication line such as the Internet, or recorded in a non-temporary recording medium such as a memory card and provided.

The transport vehicle body 201 has a first portion 201A having a rectangular shape in a plan view, and a second portion 201B extending upward from one side in the length direction of the first portion 201A. The first portion 201A is a portion capable of sneaking under the car carriage 100. A wheel drive motor, a sensor, a battery, a control device (all not shown) and the like are mounted inside the first portion 201A.

The transport vehicle body 201 in the present embodiment may be composed of only the first portion 201A.

The transport vehicle body 201 has a docking unit 203 for docking with the car carriage 100. The docking portion 203 includes an elevating lifter (not shown) installed in the first portion 201A, and a top plate 204 that can move up and down together with the elevating lifter. The unmanned transport vehicle 200 raises the elevating lifter with at least the first portion 201A of the transport vehicle body 201 submerged below the car carriage 100, and by bringing the top plate 204 into contact with the lower surface 101*b* of the load plate 101 of the car carriage 100, the top plate 204 is docked with the car carriage.

Two wheels 202 are attached to both sides in the width direction (short direction: Y direction) inside the transport vehicle body 201 in a plan view. The two wheels 202 provided on one side are arranged so as to be spaced apart from each other in the length direction (X direction) of the first portion 201A, and the other two wheels 202 provided on the other side and the transport vehicle body 201 have the same mounting position in the length direction, and the wheels on both sides face each other in the width direction of the transport vehicle body 201. These four wheels 202 have axles parallel to the width direction.

These four wheels 202 are Mecanum wheels that can move in any direction. The Mecanum wheel has a plurality of barrels on the circumference of the wheel 202. The barrel freely rotates around a rotating shaft that is tilted 45 degrees with respect to the axle of the wheel 202. Each wheel 202 of the Mecanum wheel structure is provided with a wheel drive motor and an encoder, respectively, and by changing the combination of the rotation directions and the rotation speeds of the four wheels 202, the transport vehicle body 201 can be moved in all directions.

The wheel drive motor and encoder provided on each wheel 202 are installed, for example, in the first portion 201A of the transport vehicle body 201.

The rotation speed of the wheel drive motor detected by the encoder (hereinafter referred to as encoder information) can be directly taken into the control device 220 or indirectly via a motor driver or the like. As a result, the control device 220 can continuously measure the number of rotations of each wheel 202 at an arbitrary time. The control device 220 controls the rotation speed of each wheel 202 at an arbitrary time from each encoder information, and drives the four wheels 202 to rotate independently of each other.

The unmanned transport vehicle 200 of the present embodiment is an omnidirectional moving mechanism provided with a Mecanum wheel. Therefore, in the unmanned transport vehicle 200, each wheel 202 is rotationally driven by an individual drive motor by a program incorporated in the storage unit of the control device 220 in advance, and the unmanned transport vehicle 200 can operate autonomously in an unmanned state.

Instead of the encoder, a sensor capable of measuring the rotation speed such as a hall sensor may be used. Further, the four wheels 202 may be a normal two-wheel independent drive system (two drive wheels and two driven wheels), or a steering wheel system called an active caster.

Further, the unmanned transport vehicle 200 of the present embodiment is an omnidirectional moving vehicle using a Mecanum wheel, but the present invention is not limited to this, and other omnidirectional moving mechanisms such as an omni wheel may be used. Alternatively, a nonholonomic movement mechanism such as an independent two-wheel drive system may be controlled according to a constraint condition on the degree of freedom of movement.

Further, by providing a communication function, sensor information, motion information of the transport vehicle body 201, and so on may be transmitted to an external system of the transport vehicle body 201, and a part of the processing of the control device 220 may be shared by using an external resource.

As shown in FIGS. 2 and 3, the unmanned transport vehicle 200 of the present embodiment has a configuration in which a part of the transport vehicle body 201 (first portion 201A) is docked with the car carriage 100 in a state of being submerged under the load plate 101 of the car carriage 100, thereby having a size corresponding to the car carriage 100 to be transported. Here, it is preferable that the size corresponds to the existing plurality of types of car carts 100.

As shown in FIG. 2, among the four casters 103 of the car carriage 100, assuming that the caster interval between the pair of approach side casters 103*a* (103) located on the side where the unmanned transport vehicle 200 enters is Cw, the first portion 201A of the transport vehicle body 201 has a body width W that is sufficiently narrower than the distance Cw between the approach side casters 103*a* (Cw>W).

As a result, when at least a pair of approach side casters 103*a* are swivelable, the unmanned transport vehicle 200 can sneak under the car carriage 100 without interfering with the car carriage 100, regardless of the turning direction of the pair of approach side casters 103*a*.

Further, as shown in FIG. 3, assuming that the height from the floor surface F on which the car carriage 100 is placed to the lower surface 101b of the load plate 101 in the car carriage 100 is CH, the transport vehicle body 201 of the unmanned transport vehicle 200 has a body height H lower than the lower surface 101b of the load plate 101 of the car carriage 100 (CH>H). As a result, the first portion 201A of the transport vehicle body 201 does not interfere with the load plate 101 of the car carriage 100, and the unmanned transport vehicle 200 can enter the bottom space K (FIGS. 1 and 3) under the car carriage 100.

As a result, the unmanned transport vehicle 200 of the present embodiment can sneak at least the entire first portion 201A of the transport vehicle body 201 under the car carriage 100.

The first detection sensor 210A is a laser range scanner that measures a distance in a space plane by laser scanning. Examples of the laser range scanner include a laser range finder (LRF) and a lidar (LiDAR: Light (Imaging) Detection and Ranging). FIG. 1 shows the laser scanning range R1 of the first detection sensor 210A.

The laser scanning range R1 shown in FIG. 1 is an example and is actually a wider range.

In the present embodiment, the distance to the car carriage 100, which is the object to be transported, can be measured. The first detection sensor 210A is attached to the backward end surface 201c side of the transport vehicle body 201 so that the projection direction of the laser beam is behind the transport vehicle body 201 (—X direction).

Here, the backward of the transport vehicle body 201 is the direction in which the unmanned transport vehicle 200 moves toward the car carriage 100. That is, as shown in FIG. 1, the unmanned transport vehicle 200 of the present embodiment has an operation specification of approaching the car carriage 100 in the —X direction (backward) by back movement, and thus the first detection sensor 210A is attached to the backward end surface 201c side of the transport vehicle body 201. The first detection sensor 210A is located substantially at the center of the backward end surface 201c in the width direction (Y direction) of the transport vehicle body 201.

The laser scanning surface of the first detection sensor 210A is horizontal and lower than the lower surface 101b of the load plate 101 of the car carriage 100, and each caster 103 of the car carriage 100 is fixed at a height at which it can be detected. Since the first detection sensor 210A is installed at the height position of the caster 103 of the car carriage 100, it faces the caster 103 in the horizontal direction and does not detect the load plate 101 or the like of the car carriage 100.

The first detection sensor 210A can measure the distance to the surface of an object in the surrounding environment existing in the plane space within the laser scanning range R1 shown in FIG. 1. The laser scanning range R1 of the first detection sensor 210A is, for example, a range in which the projection angle θ is 270° at the maximum. The first detection sensor 210A can detect the presence/absence of an object existing in the laser scanning range R1 depending on the presence/absence of laser reflection. The projected light reachable distance in the laser scanning range R1 is, for example, about 15 m.

The first detection sensor 210A can detect the distance and direction to the object depending on the degree of reflection of the irradiated laser. The first detection sensor 210A outputs data indicating the presence or absence of an object and the distance and direction to the object. In the following description, the output of the first detection sensor 210A will be referred to as a "measured value".

The number of installations of the first detection sensor 210A is not limited to one, and a sufficient number may be provided to secure the required viewing range. Further, the installation position of the first detection sensor 210A is not limited to the backward end surface 201c of the transport vehicle body 201, and may be installed in another appropriate place and orientation.

The first detection sensor 210A is not limited to the above example, and may be another type of sensor. For example, the first detection sensor 210A may use another high-precision distance sensor such as a three-dimensional LIDER. In this case, it is sufficient that a certain plane in the three-dimensional scan space of the HIDER coincides with the projection surface of the first detection sensor 210A.

The control device 220 includes a processor such as a CPU and a computer having a memory and a storage medium, and can execute software. The control function of the control device 220 is realized by software.

The control device 220 of the present embodiment has an object detection map generation unit 221 and generates an object detection map based on the detection data of the first detection sensor 210A and the like.

Further, the control device 220 includes a motion control unit having a function of processing Inverse Kinematics (IK) that converts to the rotational angular velocity of each wheel axle corresponding to translation speed and turning angular velocity having an arbitrary direction and size at the representative position of the unmanned transport vehicle 200 (here, the central position of the unmanned transport vehicle 200 (the part where the XYZ coordinate system is placed)), and Direct Kinematics (DK) that converts the translation speed and turning angular velocity of the representative position of the unmanned transport vehicle 200 corresponding to the rotation speed of the wheel set.

The operation control unit controls the wheel drive motor and the like based on the detection data and the like acquired from the first detection sensor 210A. The operation control unit can control the moving speed of the unmanned transport vehicle 200, and can control the speed of the unmanned transport vehicle 200 at any time.

The motion control unit has a self-position estimation function by matching of the existing object detection map using the time integration (dead reckoning) of the translational speed and turning angular velocity of the transport vehicle body 201 obtained by the direct kinematics processing mechanism (DK) and the detection distance information (LRF information) by the first detection sensor 210A.

Further, the motion control unit has a position control function (global movement) that generates a route from the current location to the target position by relying on the object detection map generated by the object detection map generation unit 221, and capable of reaching the target position while following the generation route. The distance measuring unit used to acquire the detected distance information at this time is not limited to the same as that of the first detection sensor 210A, and a dedicated motion control unit may be separately attached at an arbitrary position and orientation.

Next, an operation example (transportation system example) of the unmanned transport vehicle 200 will be described.

Figure 4:
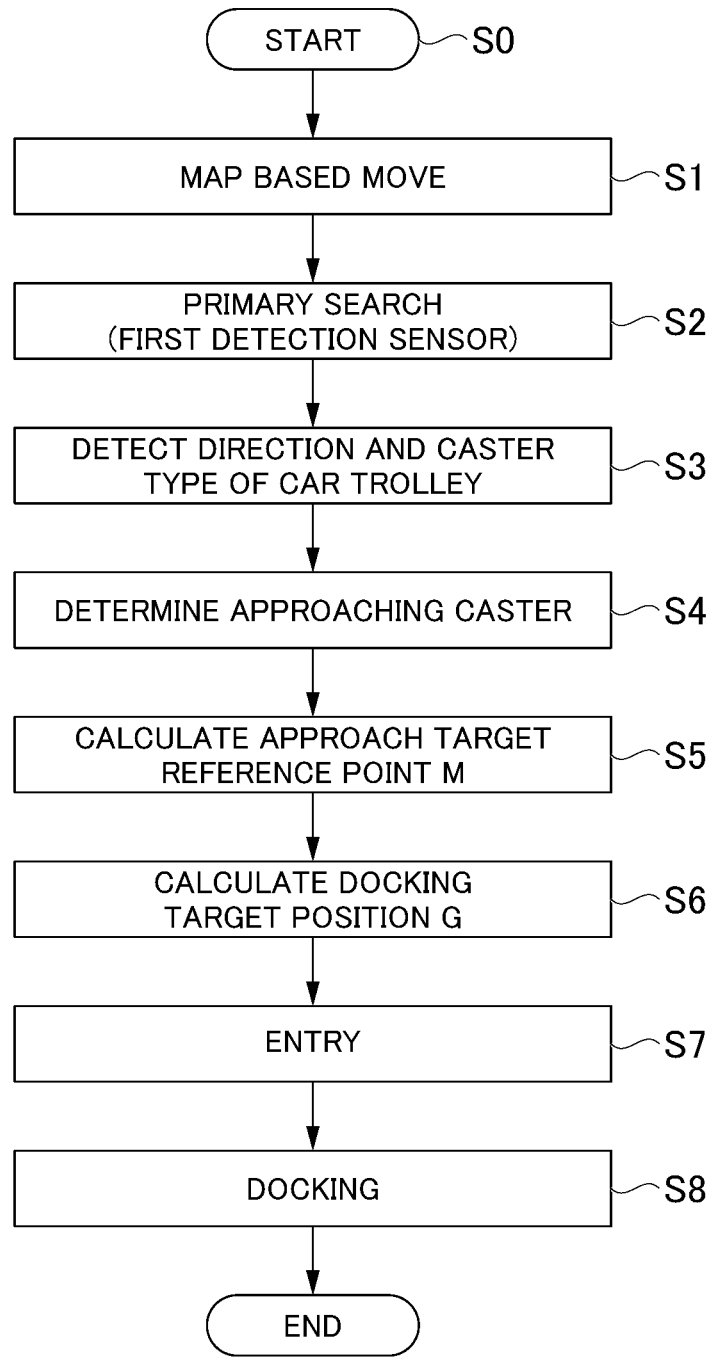
FIG. 4 is a diagram showing a control flowchart of a control device in the unmanned transport vehicle of the first embodiment.
Figure 5:
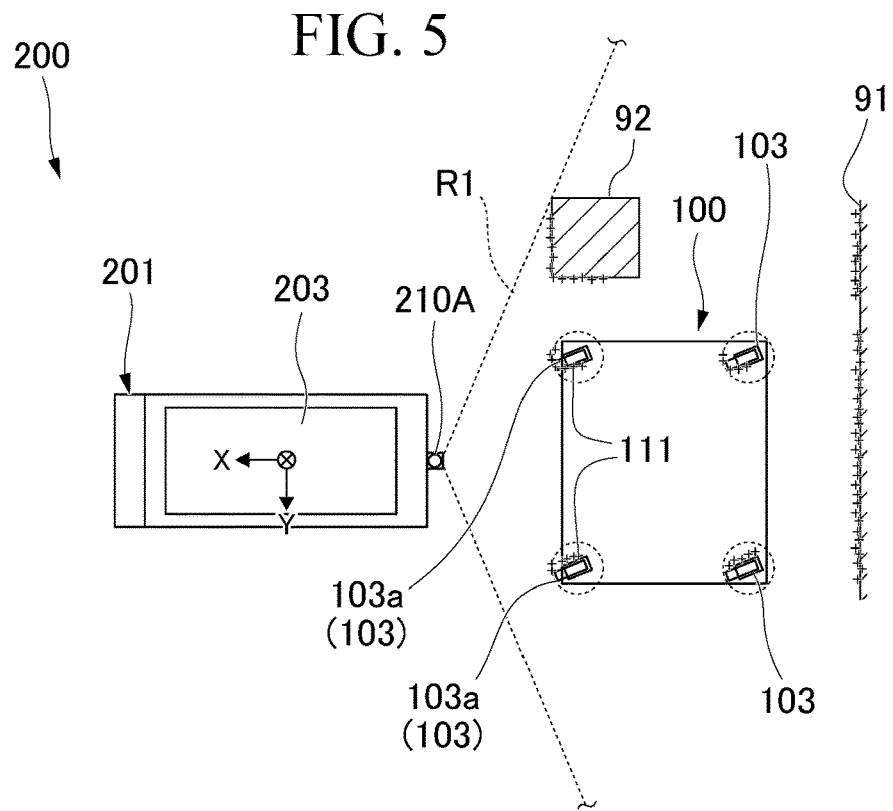
FIG. 5 is a plan view showing an object search range by an unmanned transport vehicle according to the first embodiment.
Figure 6:
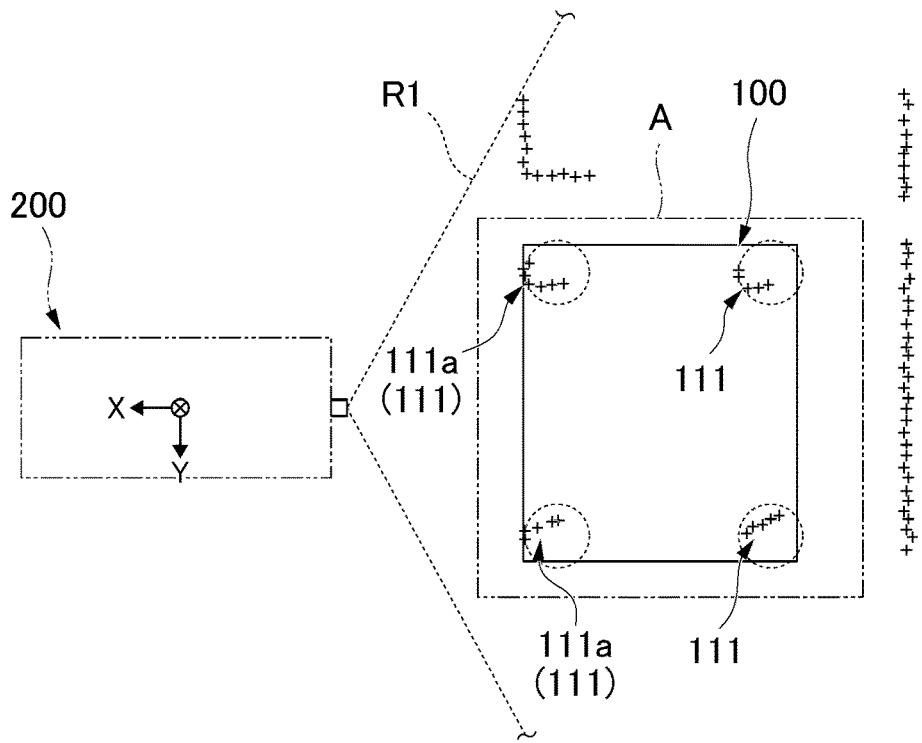
FIG. 6 is a diagram showing an example of an object detection map that visualizes an object detection position.
Figure 7:
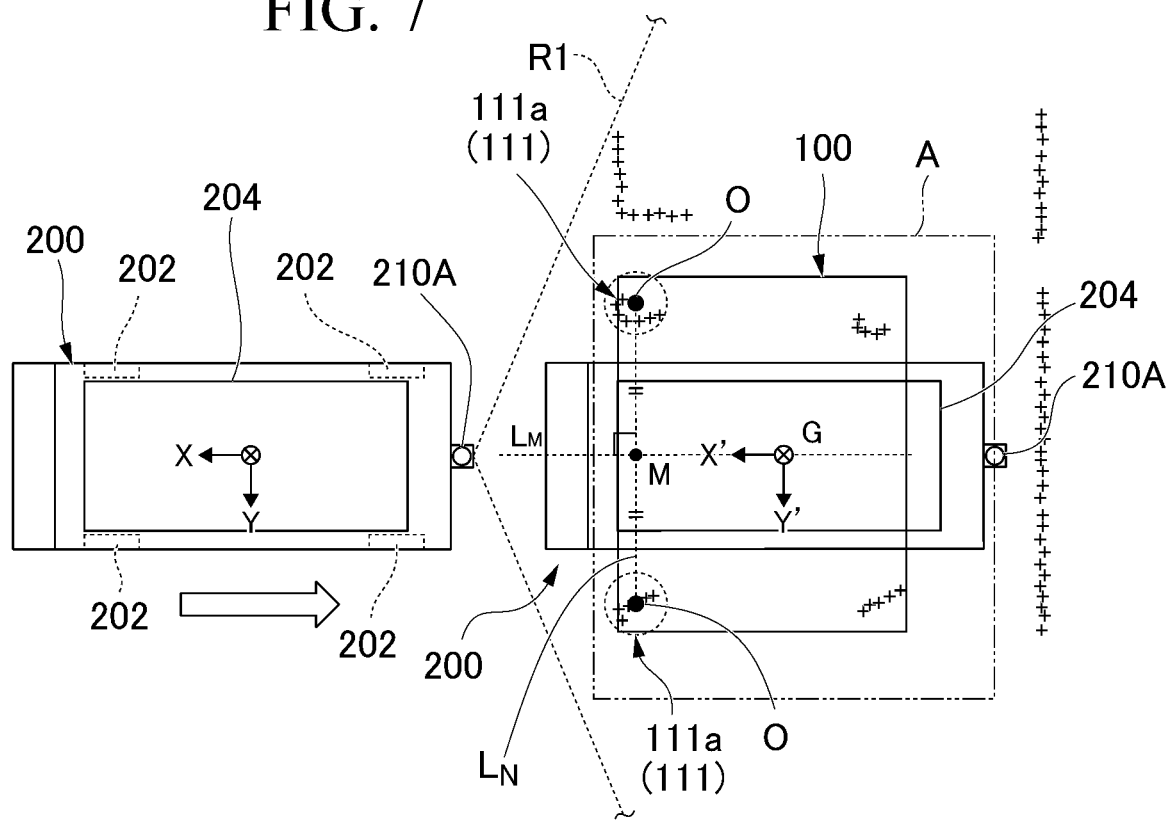
FIG. 7 is a plan view showing an operation example of an unmanned transport vehicle based on a caster detection position of a car carriage.

FIG. 4 is a diagram showing a control flowchart of the control device in the unmanned transport vehicle of the first embodiment. FIG. 5 is a plan view showing an object search range by the unmanned transport vehicle of the first embodiment. FIG. 6 is a diagram showing an example of an object detection map that visualizes the detection position of an object. FIG. 7 is a plan view showing an operation example of the unmanned transport vehicle based on the caster detection position of the car carriage.

A description will be given with reference to FIGS. 4, 6 and 7, and with reference to the control flowchart of the control device 220 shown in FIG. 5.

The control device 220 of the activated unmanned transport vehicle 200 first executes step S0.

In step S0, the control device 220 starts controlling the unmanned transport vehicle 200 after initializing the first detection sensor 210A.

Next, the control device 220 executes step S1.

In step S1, the control device 220 autonomously moves the unmanned transport vehicle 200 to the vicinity of the car carriage 100 to be transported by the position control function (global movement) of the operation control unit. The control device 220 brings the unmanned transport vehicle 200 closer to the vicinity of the car carriage 100 to be transported by driving the four wheels 202 individually.

In the present embodiment, docking from the long side of the car carriage 100 will be described as an example. Therefore, in step S1, as shown in FIG. 5, the unmanned transport vehicle 200 is moved to the forward on the long side side of the car carriage 100. When the docking operation of the unmanned transport vehicle 200 with respect to the car carriage 100 is performed from a different direction, the global movement destination may be set to a different position. For example, the global movement destination may be the forward of the car carriage 100 on the short side.

Next, the control device 220 executes step S2.

In step S2, the control device 220 executes a primary search by the first detection sensor 210A. The control device 220 projects a laser beam from the first detection sensor 210A toward the car carriage 100, detects an object in the surrounding environment existing in the plane space within the laser scanning range R1, and measures the distance to the surface of the detected object. The control device 220 acquires the detection point cloud data of the object existing in the laser scanning range R1.

As shown in FIG. 5, the object detected by the first detection sensor 210A is not only the caster 103 of the car carriage 100 existing in the plane space within the laser scanning range R1, but also an environmental structure such as surrounding walls 91 and pillars 92 at the same height as the caster 103, and these are also detected at the same time as the caster 103. The purpose of the primary search operation is that, among the four casters 103 of the car carriage 100, at least the detection point cloud group data of the casters 103a (hereinafter, the approach side casters 103a) located on the long side where the unmanned transport vehicle 200 docks is acquired.

Next, the control device 220 executes step S3.

In step S3, the control device 220 detects the orientation of the car carriage 100 and the type of caster 103.

First, the control device 220 collects a group of detection point clouds that are densely packed in a range close to the size of the caster 103 of the car carriage 100 as one cluster information, from the plurality of object detection point cloud data acquired through the first detection sensor 210A, and this is regarded as the point cloud cluster 111 detected from one caster (approach side caster 103a) (FIG. 5). In the present embodiment, the point cloud cluster 111 closest to the unmanned transport vehicle 200 is regarded as the approach side caster 103a.

The storage unit of the control device 220 stores in advance the shape pattern of the point cloud cluster 111 that changes depending on the size of the caster 103 and the orientation (turning direction) of the caster 103. Therefore, the control device 220 compares the shape pattern of the point cloud cluster stored in the storage unit with the shape pattern of the actually acquired point cloud cluster 111, and based on these matchings, determines that the caster 103 of the car carriage 100 to be transported is a point cloud cluster 111 from the object detection point cloud data, determines whether the caster 103 detected by the point cloud cluster 111 is a swivel type or a swivel shaft fixed type, and determines the orientation of the car carriage 100 to be transported based on the type of the detected caster 103 and its caster orientation.

Here, learning processing such as deep learning may be used for matching with the shape pattern of the point cloud cluster 111 stored in the storage unit of the control device 220.

Further, in the case where the car carriage 100 is operated to be placed in a predetermined place on the floor surface F in advance, the search range of the caster 103 by the first detection sensor 210A does not have to be the entire search range (laser scanning range R1) of the first detection sensor 210A. That is, instead of performing pattern matching on all the point cloud clusters detected in the search range (laser scanning range R1) by the first detection sensor 210A, only the detection points included in the region including the position where the car carriage 100 is presumed to exist (hereinafter referred to as the neighborhood region A) may be the caster search target. As a result, the risk of erroneously detecting other than the caster 103 can be reduced, and the calculation processing load required for the search can be reduced. The neighborhood region A shown in FIGS. 6 and 7 is shown in a rectangular shape along the outer shape of the car carriage 100, but the range showing the limited neighborhood region A is not limited to the rectangular shape.

Next, the control device 220 executes step S4.

In step S4, the control device 220 determines the approach side caster 103a.

As the point cloud cluster 111 detected by the first detection sensor 210A, there is a possibility that up to four casters 103 can be detected from one car carriage 100 depending on the size of the search range (laser scanning range R1).

Further, when another car carriage 100 that is not the transportation target is arranged on the floor surface F in addition to the car carriage 100 that is the transportation target, depending on the size of the search range (laser scanning range R1) by the first detection sensor 210A, there is a possibility that the caster 103 of another car carriage 100 existing in the search range (laser scanning range R1) may also be detected.

Therefore, in step S4, as shown in FIG. 6, it is assumed that the global movement can be realized to the vicinity of the car carriage 100 to be transported, and the two point cloud clusters 111a closest to the first detection sensor 210A are regarded as a pair of approach side casters 103a on the docking side of the car carriage 100 to be transported.

Next, the control device 220 executes step S5.

In step S5, the control device 220 calculates the approach target reference point M of the unmanned transport vehicle 200. As shown in FIG. 7, the control device 220 determines the representative position O (here, the center position of the caster 103) in the pair of approach side casters 103a from the two point cloud clusters 111a. Here, the control device 220 regards the position of the center of gravity of each of the two point cloud clusters 111a detected by the first detection sensor 210A as the center position of each approach side caster 103a. The control device 220 calculates the midpoint of the first straight line LN connecting the representative positions O of the approach side casters 103a as the approach target reference point M of the unmanned transport vehicle 200.

Here, the approach target reference point M is a target point when the unmanned transport vehicle 200 approaches the car carriage 100.

Next, the control device 220 executes step S6.

In step S6, the control device 220 calculates the docking target position G.

As shown in FIG. 7, at the approach target reference point M, which is the midpoint of the first straight line LN, the direction along the second straight line LM orthogonal to the first straight line LN is defined as the traveling direction (backward direction) of the unmanned transport vehicle 200, and the control device 220 calculates the docking target position G with respect to the car carriage 100, with reference to geometric information (known) such as the dimensions of the car carriage 100 and the unmanned transport vehicle 200, and the predetermined docking approach amount (specified value) to the car carriage 100. At this time, it is preferable that the docking target position G is within the bottom space K (FIGS. 1 and 3) of the car carriage 100, and coincides with or near the position of the center of gravity of the car carriage 100 in the Z direction (vertical direction).

Here, the docking target position G is a position that is a target of the docking position with respect to the car carriage 100.

Next, the control device 220 executes step S7.

In step S7, the control device 220 causes the unmanned transport vehicle 200 to enter the bottom space K under the car carriage 100. By driving each wheel 202, the control device 220 moves the transport vehicle body 201 toward the car carriage 100 in the —X direction (backward). At this time, the control device 220 moves the transport vehicle body 201 along the first straight line LN, and causes the first portion 201A of the transport vehicle body 201 to enter the bottom space K under the car carriage 100 to be transported. The control device 220 stops the unmanned transport vehicle 200 at the docking target position G (FIG. 7). At this time, it is preferable that the position of the center of gravity of the unmanned transport vehicle 200 and the docking target position G of the car carriage 100 coincide with each other in the Z direction (vertical direction).

Next, the control device 220 executes step S8.

In step S8, the control device 220 executes a docking operation to the car carriage 100. At the docking target position G, the control device 220 raises the elevating lifter of the docking portion 203 of the unmanned transport vehicle 200, so that the top plate 204 connected to the elevating lifter comes into contact with the lower surface 101b of the load plate 101 of the car carriage 100. In this way, the docking operation to the car carriage 100 is completed.

After that, the control device 220 moves the transport vehicle body 201 toward a predetermined transport destination, and shifts to the operation of transporting the car carriage 100.

As described above, according to the unmanned transport vehicle 200 of the present embodiment, the approach side caster 103a of the car carriage 100 can be detected and moved toward the docking target position calculated based on these positions and types, so that it is possible to dock the car carriage 100 at a position (accurate position) and orientation advantageous for transporting the car carriage 100. Here, the positions and orientations that are advantageous for transportation are the positions and orientations that improve the docking balance.

Since the unmanned transport vehicle 200 of the present embodiment does not need to modify the car carriage 100 and the environmental equipment, it is possible to detect and dock the car carriage 100 to be transported only by preparing the unmanned transport vehicle 200, thereby being highly versatile and capable of keeping costs down.

In the above embodiment, an operation example corresponding to a plurality of types of existing car carriages 100 has been described, but it is not always necessary to execute all the above-mentioned operation steps. For example, if the type and state of the corresponding car carriage 100 (caster 103) are known in advance, step S3 may be omitted.

Hereinafter, another operation example (transportation system example) of the unmanned transport vehicle 200 will be described.

Here, instead of letting the unmanned transport vehicle 200 located away from the car carriage 100 go straight to the docking target position G, after moving to the approach side of the car carriage 100 to a position facing the unmanned transport vehicle 200 (movement waypoint P), the vehicle is gradually moved to the docking target position G via the approach target reference point M.

Figure 8:
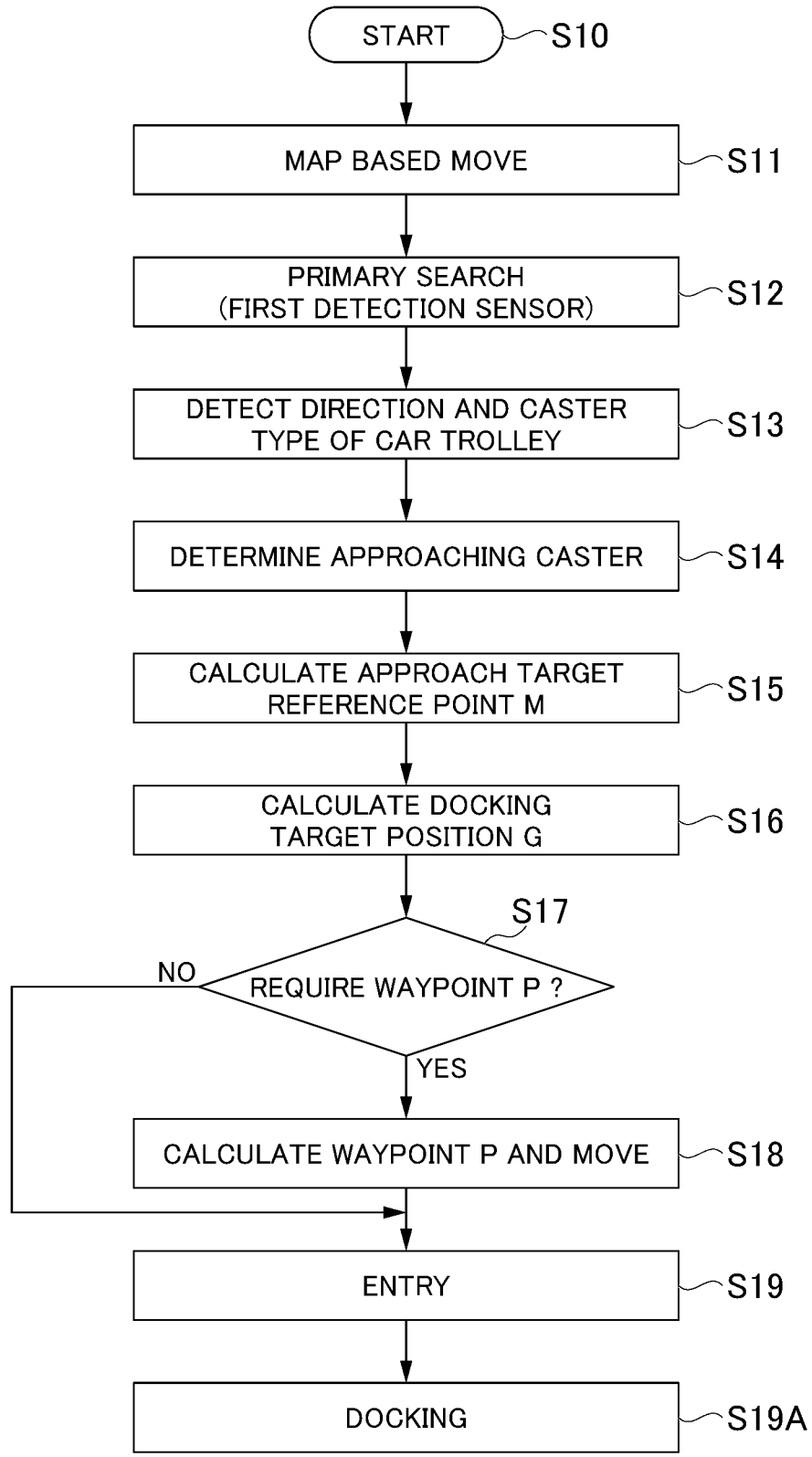
FIG. 8 is a diagram showing a control flowchart of another operation example of the unmanned transport vehicle.
Figure 9:
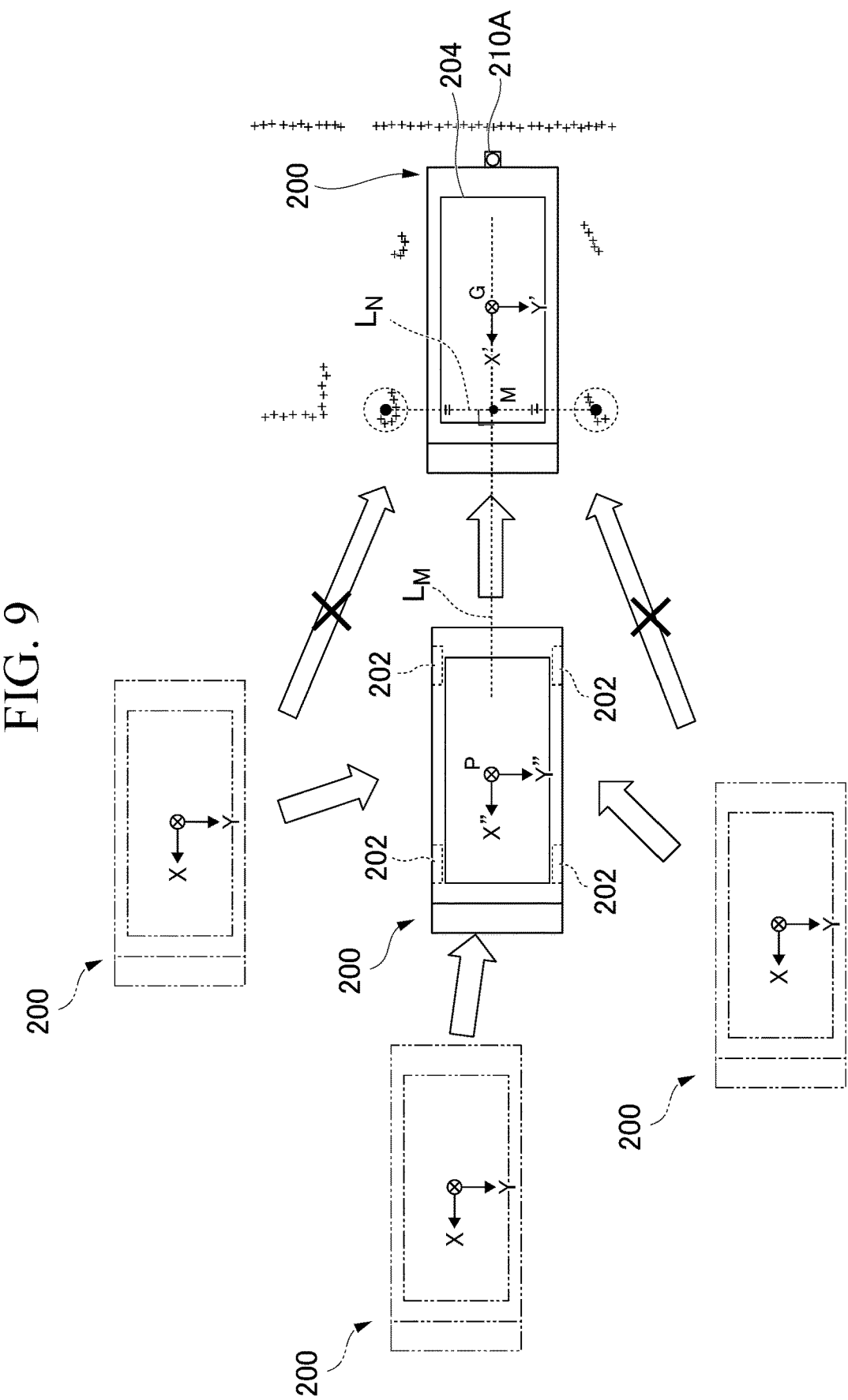
FIG. 9 is a diagram showing another operation example of the unmanned transport vehicle.

FIG. 8 is a diagram showing a control flowchart of another operation example of the unmanned transport vehicle 200. FIG. 9 is a diagram showing another operation example of the unmanned transport vehicle 200.

The control device 220 of the unmanned transport vehicle 200 shown in FIG. 9 first executes steps S10 to S16 as shown in FIG. 8. Since steps S10 to S16 in the control flow of the present embodiment are the same as steps S0 to S6 shown in FIG. 4 of the first embodiment, a description thereof will be omitted.

Next, the control device 220 executes step S17.

In step S17, the control device 220 determines whether or not the unmanned transport vehicle 200 needs a movement waypoint P. The control device 220 executes step S17 before moving the unmanned transport vehicle 200 to the final movement target position (docking target position G) calculated in step S16, and determines whether or not a movement waypoint P is required between the current location of the unmanned transport vehicle 200 and the car carriage 100, from the positional relationship between the unmanned transport vehicle 200 and the car carriage 100 at the initial position shown by the virtual line in FIG. 9.

That is, when moving to the vicinity of the unmanned transport vehicle 100 by the position control function (overall movement) of the operation control unit, the control device 220 determines whether or not the current location of the unmanned transport vehicle 200 can be directly moved to the docking target position G with respect to the car carriage 100, depending on the positional relationship between the unmanned transport vehicle 200 and the car carriage 100. Then, when it is determined whether or not a movement waypoint P is required between the current position of the unmanned transport vehicle 200 and the unmanned transport vehicle 100, the movement waypoint P is set between the approach target reference point M of the car carriage 100 and the unmanned transport vehicle 200.

Here, the movement waypoint P is a position where the unmanned transport vehicle 200 can directly move to the docking target position G.

Next, the control device 220 executes step S18.

In step S18, the control device 220 determines the movement waypoint P and moves the unmanned transport vehicle 200. In the previous step S17, the control device 220 cannot move the unmanned transport vehicle 200 straight from the current location of the unmanned transport vehicle 200 to the docking target position G without interfering with the caster 103 of the car carriage 100. When it is determined that it is necessary to determine the movement waypoint P, as shown in FIG. 9, the movement waypoint P is set to a position on the forward side of the car carriage 100 in the direction along the second straight line LM. Then, the unmanned transport vehicle 200 is moved toward the predetermined movement waypoint P. By executing steps S17 to S18, the control device 220 first moves the unmanned transport vehicle 200 to the movement waypoint P before moving it to the docking target position G.

Next, the control device 220 executes step S19.

In step S19, the control device 220 causes the unmanned transport vehicle 200 located at the movement waypoint P to enter under the car carriage 100 and move to the docking target position G.

After that, the control device 220 executes step S19A to perform a docking operation with respect to the car carriage 100 at the docking target position G.

As described above, the control device 220 may execute a stepwise moving procedure so as to move the unmanned transport vehicle 200 to the movement waypoint P and then to the docking target position G. As a result, no matter from which position the unmanned transport vehicle 200 starts the docking operation, the docking operation with the car carriage 100 can be smoothly completed without coming into contact with the caster 103 of the car carriage 100.

Second Embodiment

Figure 10:
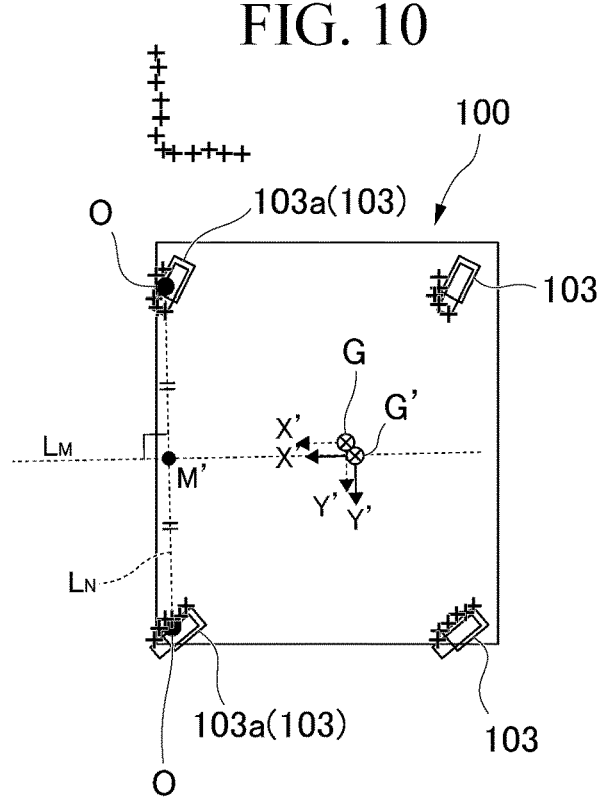
FIG. 10 is a diagram showing a positional relationship between a first approach target reference point (M') and a first docking target position (G') set according to a type of the approach side caster (swivel type), and an ideal approach target reference point (M) and a docking target position (G).
Figure 11:
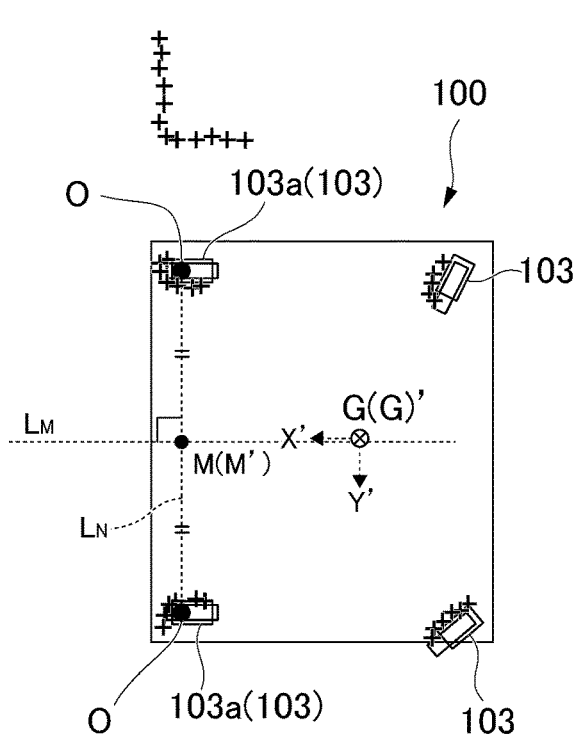
FIG. 11 is a diagram showing a positional relationship between a first approach target reference point (M') and a first docking target position (G') set according to a type of approach side caster (fixed swivel shaft type), and an ideal approach target reference point (M) and a docking target position (G).
Figure 12:
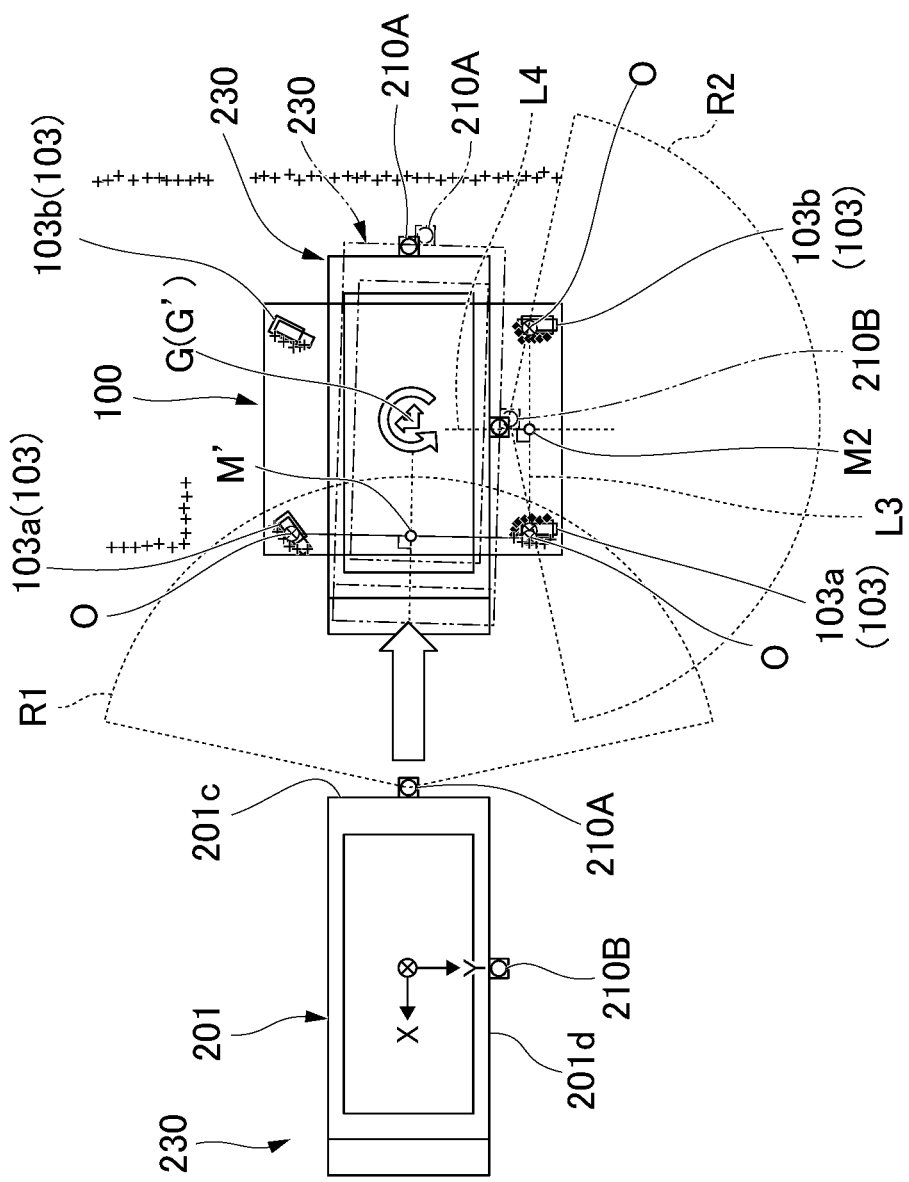
FIG. 12 is a diagram showing a configuration of an unmanned transport vehicle according to a second embodiment and an operation example thereof.

FIG. 10 is a diagram showing a positional relationship between a first approach target reference point (M') and a first docking target position (G') set according to a type of the approach side caster (swivel type), and an ideal approach target reference point (M) and a docking target position (G). FIG. 11 is a diagram showing a positional relationship between a first approach target reference point (M') and a first docking target position (G') set according to a type of approach side caster (fixed swivel shaft type), and an ideal approach target reference point (M) and a docking target position (G). FIG. 12 is a diagram showing a configuration of an unmanned transport vehicle according to a second embodiment and an operation example thereof. The laser scanning ranges R1 and R2 shown in FIG. 12 are examples and are actually wider.

Here, first, depending on the caster type of the car carriage 100, the relationship between the orientation when the movement of the unmanned transport vehicle with respect to the car carriage 100 is completed and the ideal orientation at the time of docking will be described.

The operating accuracy of the unmanned transport vehicle at the time of docking may change depending on the type of caster 103 of the car carriage 100. At least, the pair of approach side casters 103a in the car carriage 100 may be changed depending on whether it is a swivel type or a swivel shaft fixed type.

When the four casters 103 in the car carriage 100 are swivelable, the orientations of all the casters 103 are often different from each other, as shown in FIG. 10. Therefore, there is a high possibility that the orientations of the pair of approach side casters 103a are different from each other, and the first approach target reference point M' and the first docking target position G' calculated based on the representative position O of each approach side caster 103a are deviated from the ideal docking target position G (for example, the center position of the car carriage 100). In this case, there is a high possibility that the orientation when the movement of the unmanned transport vehicle is completed, that is, the orientation when the docking target position G is reached, is different from the ideal orientation of the unmanned transport vehicle at the docking target position G.

On the other hand, as shown in FIG. 11, when at least a pair of approach-side casters 103a on the unmanned transport vehicle side of the car carriage 100 are of the swivel shaft fixed type, the orientations of these pair of approach side casters 103a are in agreement with each other, and there is no change in orientation. Therefore, it is possible to estimate by aligning the direction along the first approach target reference point M', which is calculated based on the representative position O of the approach side caster 103a with fixed swivel shaft, and the second straight line LM perpendicular to the first straight line LN at the first approach target reference point M' to the center line of the trolley 100. Therefore, the first approach target reference point M' and the first docking target position G' calculated based on the representative position O of the pair of approach side casters 103a with a fixed swivel axis can both be designated as the ideal approach target reference point M and the docking target position G. Therefore, the orientation of the unmanned transport vehicle when the movement is completed, that is, the orientation of the unmanned transport vehicle when the docking target position G is reached, substantially matches the orientation of the unmanned transport vehicle ideal at the docking target position G.

Based on the above, the unmanned transport vehicle 230 of the second embodiment will be described.

As shown in FIG. 12, the unmanned transport vehicle 230 of the present embodiment is different from the first embodiment in that it includes a plurality of detection sensors.

The unmanned transport vehicle 230 of the present embodiment includes two detection sensors 210A and 210B. The pair of detection sensors 210A and 210B can measure the distance to the surface of an object in the surrounding environment existing in the plane space within the respective laser scanning ranges R1 and R2. The laser scanning ranges R1 and R2 of these detection sensors 210A and 210B are, for example, a maximum range of 270°.

The first detection sensor 210A is provided on the backward end surface 201c of the transportation vehicle body 201 in the unmanned transport vehicle 230, and the second detection sensor (detection sensor) 210B is provided on the side end surface 201d on one side in the width direction of the transportation vehicle body 201. The first detection sensor 210A is located substantially in the center of the backward end surface 201c in the width direction, and the second detection sensor 210B is located substantially in the center of the side end surface 201d in the width direction.

Each of the first detection sensor 210A and the second detection sensor 210B has a horizontal laser scanning surface and is lower than the lower surface 101b of the load plate 101 of the car carriage 100, and are fixed at a height at which each caster 103 of the car carriage 100 can be measured. Since the first detection sensor 210A and the second detection sensor 210B are installed at the same position as the height of the caster 103 in the car carriage 100 in the Z direction, the load plate 101 and the like of the car carriage 100 are not detected.

The second detection sensor 210B is not limited to the position shown in the figure. Any other location may be used as long as it can satisfactorily detect the secondary search location (depth side caster 103b) of the car carriage 100 to be transported.

The unmanned transport vehicle 230 of the present embodiment is suitable for transporting the unmanned transport vehicle 100, for example, in which casters 103 of a swivelable type and a swivel shaft fixed type are mixed. For example, in the car carriage 100 to be transported shown in FIG. 12, of the four casters 103, a pair of casters 103 (103a, 103b) located on one short side of the car carriage 100 are rotatable, and the pair of casters 103 (103a, 103b) located on the other short side are fixed to the swivel shaft. Therefore, of the car carriage 100, one of the pair of approach side casters 103a located on the long side on which the unmanned transport vehicle 230 enters is a swivel type, the other is a swivel shaft fixed type. One of the pair of depth side casters 103b located on the depth side of the car carriage 100 is a swivel type, and the other is a swivel shaft fixed type.

Next, an operation example (transport system example) of the unmanned transport vehicle 230 of the second embodiment will be described.

Figure 13:
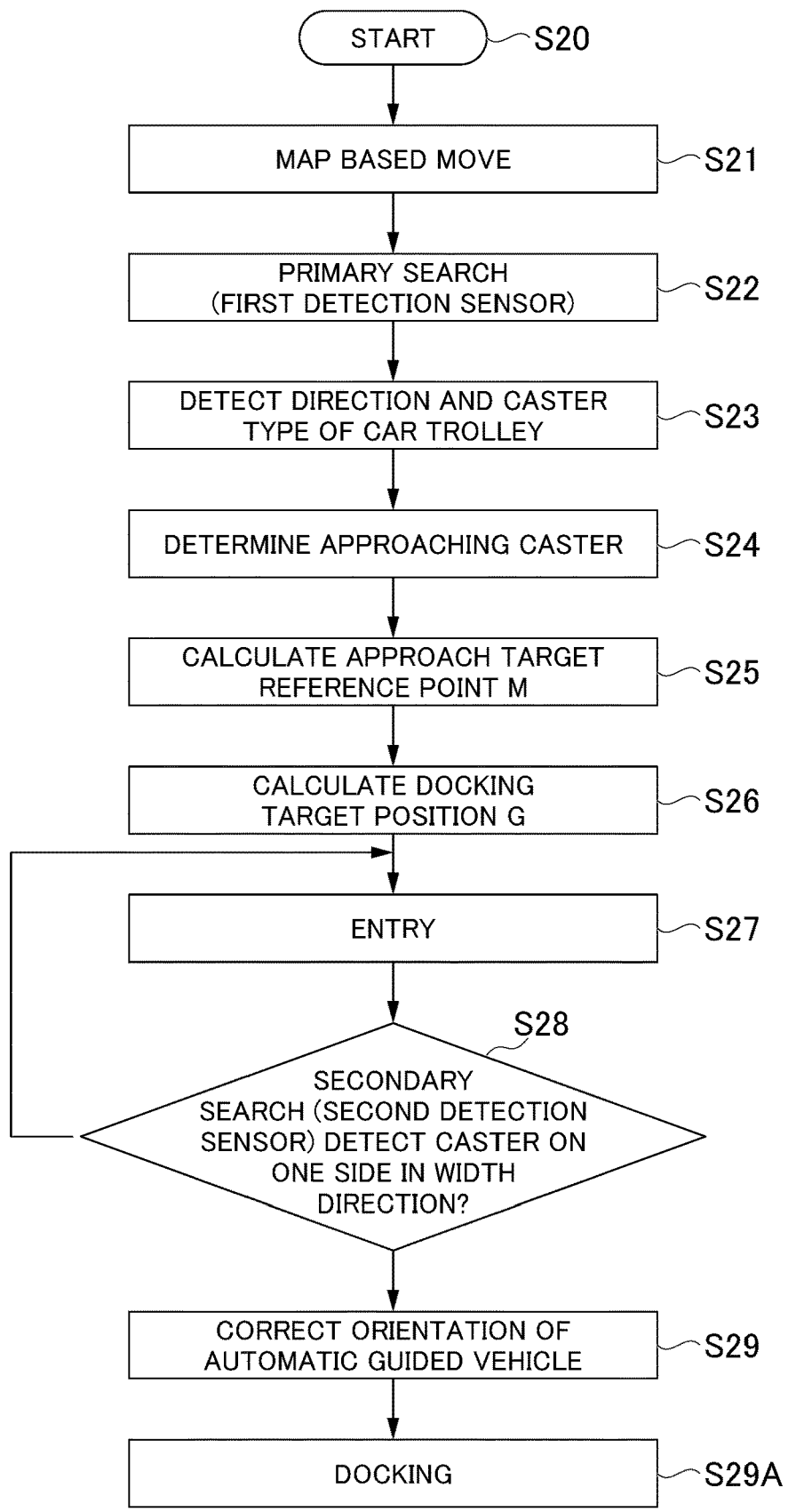
FIG. 13 is a diagram showing a control flowchart of an operation example of the unmanned transport vehicle 230 of the second embodiment.

FIG. 13 is a diagram showing a control flowchart of an operation example of the unmanned transport vehicle 230 of the second embodiment.

Here, an operation example will be described in a case of making the unmanned transport vehicle 230 of the present embodiment shown in FIG. 12 enter the bottom space K (FIGS. 1 and 3) from between the swivel type approach side caster 103a and the swivel shaft fixed type approach side caster 103a in the car carriage 100.

The control device 220 of the unmanned transport vehicle 230 first executes steps S20 to S22 as shown in FIG. 13. Since steps S20 to S22 are the same as steps S0 to S2 of the first embodiment, a description thereof will be omitted.

Next, the control device 220 executes step S23.

In step S23, the control device 220 detects the orientation of the car carriage 100 and the type of the approach side caster 103a based on the detection result by the first detection sensor 210A. First, the control device 220 collects a group of detection points densely packed in a range close to the size of the caster 103 of the car carriage 100 as one cluster information from all the object detection point cloud data detected by the first detection sensor 210A, and regards this as the point cloud cluster 111 detected from one caster 103.

The control device 220 determines that it is the point cloud cluster 111 of the casters 103 in the car carriage 100 to be transported from the object detection point cloud data, based on the matching with the shape pattern of the point cloud cluster 111 stored in the storage unit, and determines the type of caster 103 (swivelable type or swivel shaft fixed type) from the point cloud cluster 111.

Next, the control device 220 executes step S24.

The control device 220 determines that the two point cloud clusters 111a, which are detected at the position closest to the unmanned transport vehicle 230 in step S24, are a pair of approach-side casters 103a (one is a swivel type and the other is a swivel shaft fixed type) located on the docking side of the car carriage 100 to be transported.

Next, the control device 220 executes step S25.

In step S25, the control device 220 calculates the first approach target reference point M' of the unmanned transport vehicle 230 from each representative position O of the pair of detected approach side casters 103a.

Next, the control device 220 executes step S26.

In step S26, the control device 220 calculates the first docking target position G' with respect to the car carriage 100 based on the first approach target reference point M' calculated in the previous step S25.

Next, the control device 220 executes step S27.

In step S27, the control device 220 first causes the unmanned transport vehicle 230 to enter the bottom space K under the car carriage 100. The control device 220 moves the unmanned transport vehicle 230 to −X (backward) toward the first approach target reference point M' calculated in the previous step S25, and causes the unmanned transport vehicle 230 to enter under the car carriage 100. At this time, the unmanned transport vehicle 230 is made to enter until the position of the detection sensor 210B mounted on the unmanned transport vehicle 230 exceeds at least the position of the approach side caster 103a.

Next, the control device 220 executes step S28.

In step S28, the control device 220 executes a secondary search by the second detection sensor 210B. The control device 220 projects a laser beam from the second detection sensor 210B toward one side (here, the right side in the traveling direction of the unmanned transport vehicle 200) of the car carriage 100 in the Y direction (width direction), for example, while moving the unmanned transport vehicle 230 to the docking target position G, and searches for a pair of casters 103 on a side (right side in the traveling direction) different from the approach side of the car carriage 100. At this time, among the car carriage 100, at least the caster 103a on the approach side located on the right side in the traveling direction is detected, and the caster 103b located on the depth side located on the right side in the traveling direction is searched.

In this way, the control device 220 causes the unmanned transport vehicle 200 to enter under the car carriage 100, and searches for a pair of casters 103 (depth side casters 103b) on one side in the Y direction (width direction) by the second detection sensor 210B. When another detection point cloud data (two in total), which is considered to be the caster 103, is detected at the position closest to the unmanned transport vehicle 200 in the plane space within the laser operation range R2, the control device 220 determines that the caster 103b on the depth side has been detected.

Next, the control device 220 executes step S29.

In step S29, the control device 220 corrects the orientation of the unmanned transport vehicle 230. The control device 220 obtains a fourth straight line L4 orthogonal to the third straight line L3 at the midpoint of the third straight line L3 connecting the representative position O of the approach side caster 103a detected by the second detection sensor 210B and the representative position O of the caster 103b on the depth side, and calculates an ideal docking target position G based on this, and corrects the orientation of the unmanned transport vehicle 230 at the docking target position G'. For example, as shown in FIG. 11, for example, by turning the unmanned transport vehicle 230 counterclockwise in the drawing, the side side of the unmanned transport vehicle 230 is corrected to an orientation parallel to the side side of the car carriage 100. As a result, the orientation of the unmanned transport vehicle 230 at the docking target position G can be set to an orientation suitable for transport.

If the translational component deviates from the target position G, this is also corrected.

After that, the control device 220 executes step S29A to perform a docking operation with respect to the car carriage 100 at the docking target position G.

According to the unmanned transport vehicle 230 of the second embodiment, since the unmanned transport vehicle 230 is provided with two detection sensors 210A and 210B, a search (primary search) for the caster position on the approach side is performed using the detection sensor 210A before entering the car trolley 100, and then the search (secondary search) for the casters on the depth side is executed using the detection sensor 210B after the car trolley 100 has entered, thereby it is possible to correct the orientation of the unmanned transport vehicle 230 at the docking target position G' calculated based on the primary search to the ideal final orientation at the docking target position G calculated based on the secondary search. In this way, by appropriately correcting the orientation of the unmanned transport vehicle 230 based on the type (orientation and position) of the depth side caster 103b as well as the approach side caster 103a of the car carriage 100, the unmanned transport vehicle 230 can be docked in an ideal orientation with respect to the car carriage 100 in which the swivel-type and swivel-axis-fixed casters 103 are mixed. As a result, the car carriage 100 can be suitably transported regardless of the type of the caster 103 of the car carriage 100.

Although it is assumed that the type and arrangement direction of the car carriage 100 are known, the unmanned transport vehicle itself may have a recognition function that can recognize the type and arrangement direction of the car carriage 100 by itself. Further, a notification function may be used that is provided as information on the car carriage from a higher-level server that manages the unmanned transport vehicle 230 in an integrated manner.

Third Embodiment

Next, the unmanned transport vehicle 240 of the third embodiment will be described.

Figure 14:
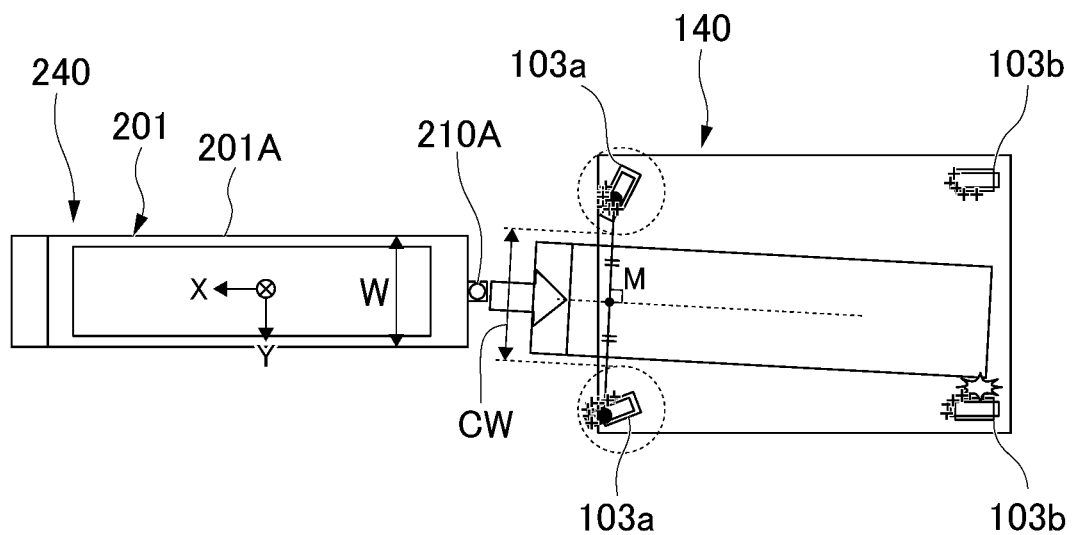
FIG. 14 is a plan view showing an operation example to be solved when the unmanned transport vehicle of a third embodiment is used.
Figure 15:
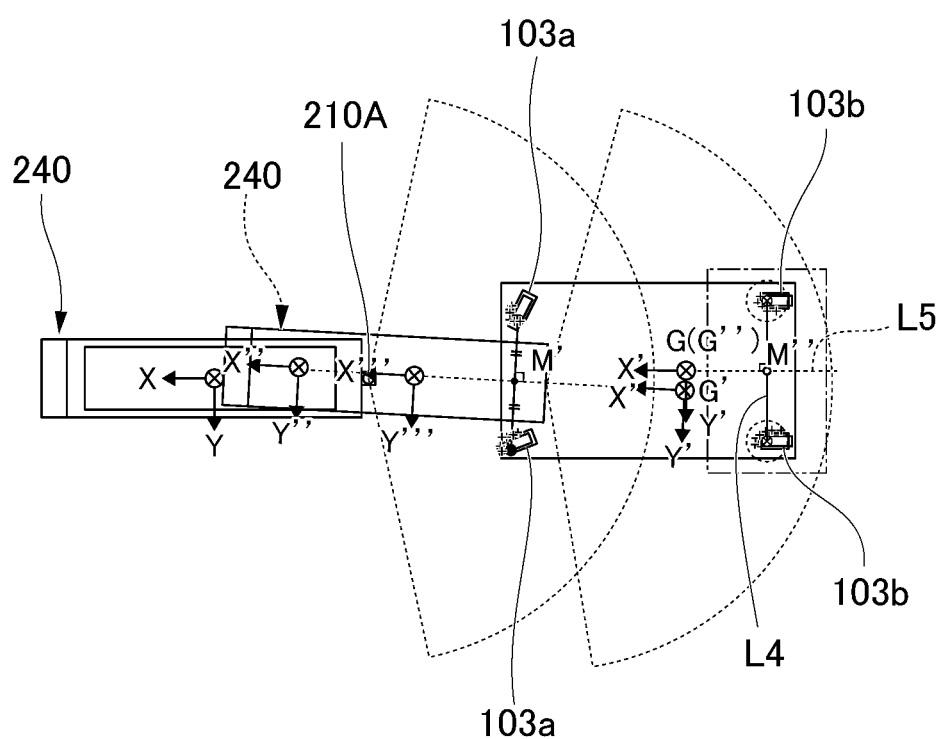
FIG. 15 is a plan view showing a preferred operation example of the unmanned transport vehicle according to the third embodiment.

FIG. 14 is a plan view showing an operation example to be solved when the unmanned transport vehicle 240 of the third embodiment is used. FIG. 15 is a plan view showing a preferable operation example of the unmanned transport vehicle 240 of the third embodiment. The laser scanning range (range indicated by the alternate long and short dash line) shown in FIG. 15 is an example and is actually a wider range.

Hereinafter, the configuration of the unmanned transport vehicle 240 will be described.

As shown in FIG. 14, the unmanned transport vehicle 240 of the present embodiment enables the transportation of the elongated car carriage 140. Here, docking is performed from the short side of the car carriage 140 as an example.

The elongated car carriage 140 to be transported has a load plate 101 having a rectangular shape in a plan view having a length in one direction, and a pair of approach-side casters 103a arranged on one short side are swivelable, and a pair of depth-side casters 103b arranged on the other short side are of a swivel shaft fixed type.

The unmanned transport vehicle 240 of the present embodiment has a transport vehicle body 201 having a length in one direction and exhibiting a rectangular shape in a plan view. The width of the transport vehicle body 201 along the lateral direction is narrower than the distance Cw between the turning ranges of the pair of swivel-type approach side casters 103a arranged on the short side side of the car carriage 140. It is preferable that the length of the unmanned transport vehicle 240 (the first portion 201A of the transport vehicle body 201) is longer than or substantially equal to the length of the car carriage 140 in the longitudinal direction.

Next, an operation example (transport system example) of the unmanned transport vehicle 240 will be described.

Figure 16:
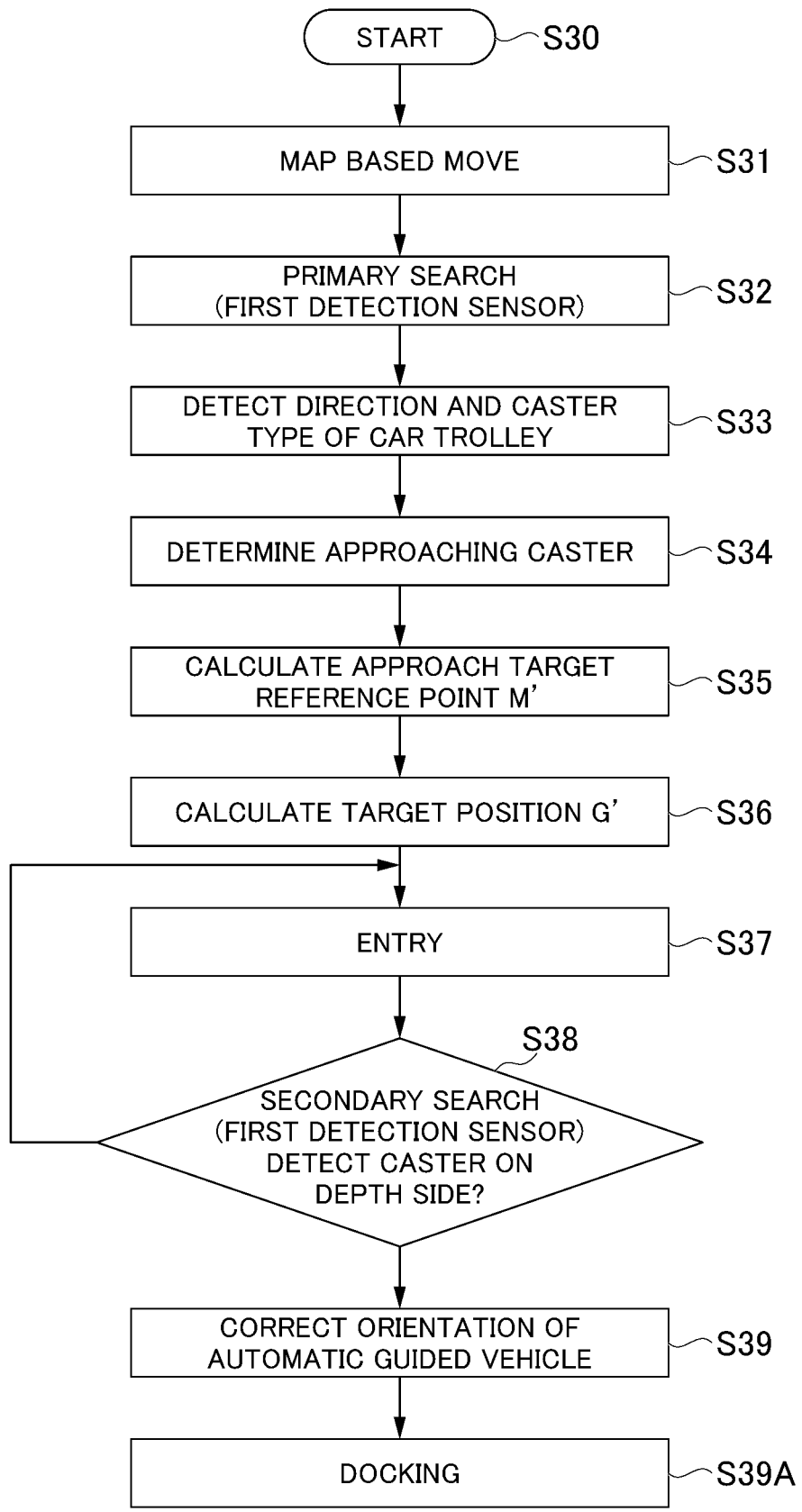
FIG. 16 is a diagram showing a control flowchart of a control device in an unmanned transport vehicle according to the third embodiment.

FIG. 16 is a diagram showing a control flowchart of a control device in the unmanned transport vehicle of the third embodiment.

An operation example will be described in a case in which the unmanned transport vehicle 240 of the present embodiment shown in FIG. 15 is entered from, for example, between a pair of swivel-type approach side casters 103a arranged on the short side of the car carriage 140.

The control device 220 of the unmanned transport vehicle 240 shown in FIG. 15 first executes steps S30 to S34 as shown in FIG. 16. Since steps S30 to S34 are the same as steps S0 to S4 of the first embodiment, a description thereof will be omitted.

Next, the control device 220 executes step S35.

In step S35, the control device 220 calculates the first approach target reference point M' of the unmanned transport vehicle 230 from each representative position of the pair of swivel-type approach-side casters 103a that have been detected.

Next, the control device 220 executes step S36.

In step S36, the control device 220 calculates the first docking target position G' with respect to the car carriage 100 based on the first approach target reference point M' calculated in the previous step S35.

Next, the control device 220 executes step S37.

In step S37, the control device 220 first moves the unmanned transport vehicle 230 toward the first approach target reference point M' calculated in step S35, and causes it to enter the bottom space K (FIGS. 1 and 3) under the car carriage 100.

Next, the control device 220 executes step S38.

In step S38, the control device 220 executes a secondary search by the first detection sensor 210A. The control device 220, for example, projects the laser beam from the first detection sensor 210A toward the side (+Y direction) of the car carriage 100 while moving the unmanned transport vehicle 230 to the first docking target position G', and detects the caster 103 in a direction different from the approach direction of the car carriage 100. Here, the positions of the approach side caster 103a and the depth side caster 103b located on one side in the width direction of the car carriage 140 are searched for.

Next, the control device 220 executes step S39.

In step S39, the control device 220 obtains a fifth straight line L5 orthogonal to the fourth straight line L4 at the first approach target reference point M" which is the midpoint of the fourth straight line L4 connecting the representative positions of the casters 103b on the depth side detected by the first detection sensor 210A, calculates a new docking target position G" (G) from the geometric information of the fifth straight line L5, the unmanned transport vehicle 230, and the car carriage 100, and corrects the orientation of the unmanned transport vehicle 240 that has entered under the car carriage 100.

That is, when the pair of approach-side casters 103a of the car carriage 140 are swivel-type, the first docking target position G' calculated based on the position (primary search result) of the swivel-type approach-side caster 103a often deviates from the ideal docking target position G.

On the other hand, since the second docking target position G" calculated based on the position (secondary search result) of the depth side caster 103b of the fixed swivel axis type substantially matches the ideal docking target position G, in order to target the second docking target position G" (G) calculated based on the secondary search result, the orientation of the unmanned transport vehicle 240 that has entered under the car carriage 100 is corrected. In this way, the unmanned transport vehicle 200 reaches the ideal docking target position G.

When the translational component deviates from the target position G, this is also corrected.

Next, the control device 220 executes docking with the car carriage 100 (step S39A).

As described above, when the slender car carriage 140 is transported by using the unmanned transport vehicle 240 of the present embodiment shown in FIG. 14, in a case where the unmanned transport vehicle 240 is entered from the short side direction of the car carriage 140, when the approach side caster 103a is a swivel shaft fixed type, since the orientations of the approaching casters 103a do not change with each other, the approach target reference point M and the docking target position G can be calculated accurately based on the primary search result. Therefore, the unmanned transport vehicle 240 can enter the vehicle in a state where the length direction is substantially parallel to the length direction of the vehicle carriage 140. Therefore, the risk of the unmanned transport vehicle 240 colliding (contacting) with the caster 103 (for example, the depth side caster 103b) of the car carriage 140 is low.

On the other hand, when the approach-side casters 103a are swivelable, it is highly possible that the orientations of the pair of approach-side casters 103a are different from each other. Therefore, when the unmanned transport vehicle 240 is entered from between the pair of swivel-type approaching casters 103a toward the first docking target position G', which has been calculated (from the second straight line LM perpendicular to the first straight line LN at the midpoint of the first straight line LN connecting each representative position O (first approach target reference point M')) based on each representative position O of these pair of swivel-type approach side casters 103a, there is a high possibility that the unmanned transport vehicle 240 will collide (contact) with the car carriage 140.

That is, since the car carriage 140 has an elongated shape, since sufficient space with the unmanned transport vehicle 240 cannot be secured in the width direction, during the operation of the unmanned transport vehicle 240, for example, the caster 103b on the tip side and the depth side of the transport vehicle body 201 may come into contact with each other.

On the other hand, according to the unmanned transport vehicle 240 of the present embodiment, when transporting the car carriage 140 having the swivel-type approach side caster 103a, after the unmanned transport vehicle 240 is made to enter under the car carriage 140 from between the pair of swivel-type approaching casters 103a toward the first approach target reference point M' calculated based on the primary search result, while the unmanned transport vehicle 240 is made to enter the car carriage 140 further in the −X direction (rearward) as shown in FIG. 15, the control device 220 detects the position of the depth side caster 103b by performing a secondary search by the first detection sensor 210A. As a result, a new second docking target position G" (G) is calculated according to the positions of the depth side casters 103b of the fixed swivel shaft type (based on the secondary search result), and by appropriately correcting the traveling direction of the unmanned transport vehicle 240, it is possible to make the unmanned transport vehicle 240 reach the ideal docking target position G.

The caster arrangement information on the back side of the car carriage 100 is known or available externally as described above. Further, when re-searching the depth side caster 103b after entering under the car carriage 140, it is possible to set the search range to a range narrowed down to some extent based on the caster arrangement information obtained from the search area.

Further, when the measurement distance of the first detection sensor 210A is sufficiently long, the orientations and types of all casters 103 in the car carriage 140 to be transported can be discriminated, and the measurement accuracy is sufficiently high, a pair of depth-side casters 103b with a fixed swivel axis may be detected in the primary search, to calculate the docking target position G from the positions of the depth side casters 103b.

However, when the depth-side caster 103b is located in the blind spot of the approach-side caster 103a and is hidden, it is preferable to switch to the search for the approach-side caster 103a without searching for the depth-side caster 103b in the primary search.

Fourth Embodiment

Next, the unmanned transport vehicle 250 of the fourth embodiment will be described.

Figure 17:
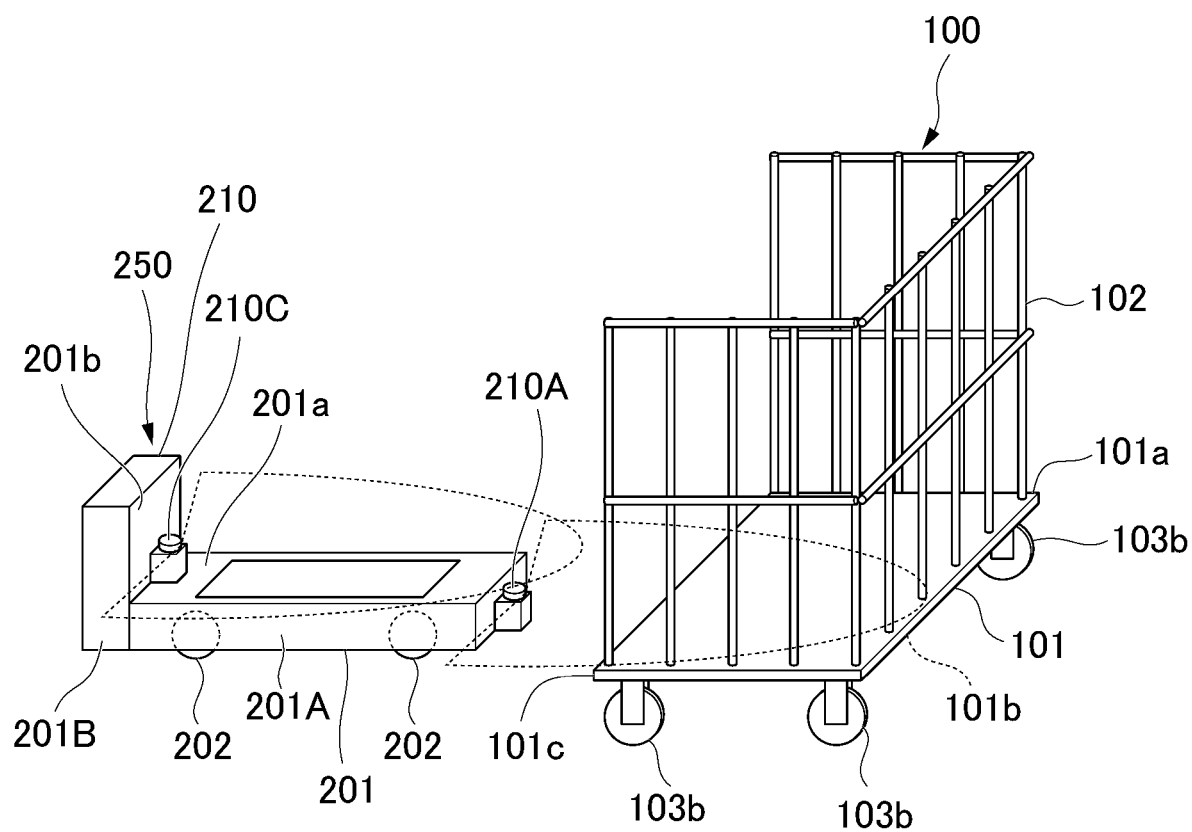
FIG. 17 is a perspective view showing the configuration and operation of the unmanned transport vehicle according to a fourth embodiment.
Figure 18:
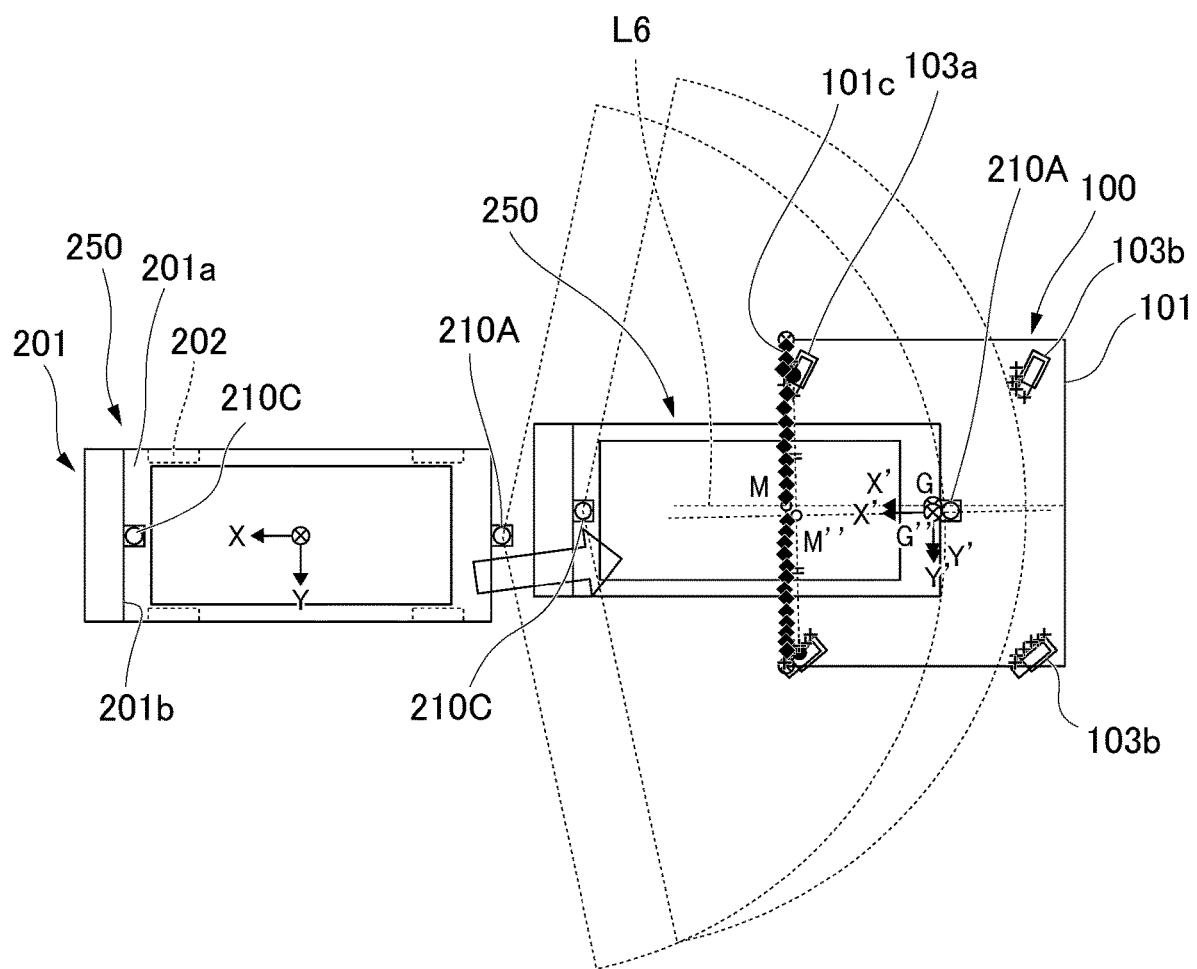
FIG. 18 is a plan view showing the configuration and operation of the unmanned transport vehicle according to the fourth embodiment.

FIG. 17 is a perspective view showing the configuration and operation of the unmanned transport vehicle according to the fourth embodiment. FIG. 18 is a plan view showing the configuration and operation of the unmanned transport vehicle according to the fourth embodiment. The laser scanning range (range indicated by the alternate long and short dash line) shown in FIGS. 17 and 18 is an example and is actually a wider range.

Hereinafter, the configuration of the unmanned transport vehicle 250 will be described.

The unmanned transport vehicle 250 of the present embodiment is a vehicle suitable for transporting the car carriage 100 in which all four casters are swivel casters.

As shown in FIGS. 17 and 18, the unmanned transport vehicle 250 in the present embodiment has a pair of detection sensors (first detection sensor 210A, third detection sensor 210C) having different installation heights.

The third detection sensor (detection sensor) 210C is on the upper surface 201a of the first portion 201A of the unmanned transport vehicle 250, and is installed so as to be in contact with the upper surface 201a of the first portion 201A and the forward surface 201b of the second portion 201B.

The position of the laser projection surface in the third detection sensor 210C is higher than the lower surface 101b of the load plate 101 of the car carriage 100 and lower than the upper surface 101a of the load plate 101, and a position facing the approach side end surface 101c of the load plate 101. The third detection sensor 210C detects the edge (side edge) of the load plate 101 from the position of the approach side end surface 101c of the load plate 101.

Next, an operation example (transport system example) of the unmanned transport vehicle 250 of the fourth embodiment will be described.

Figure 19:
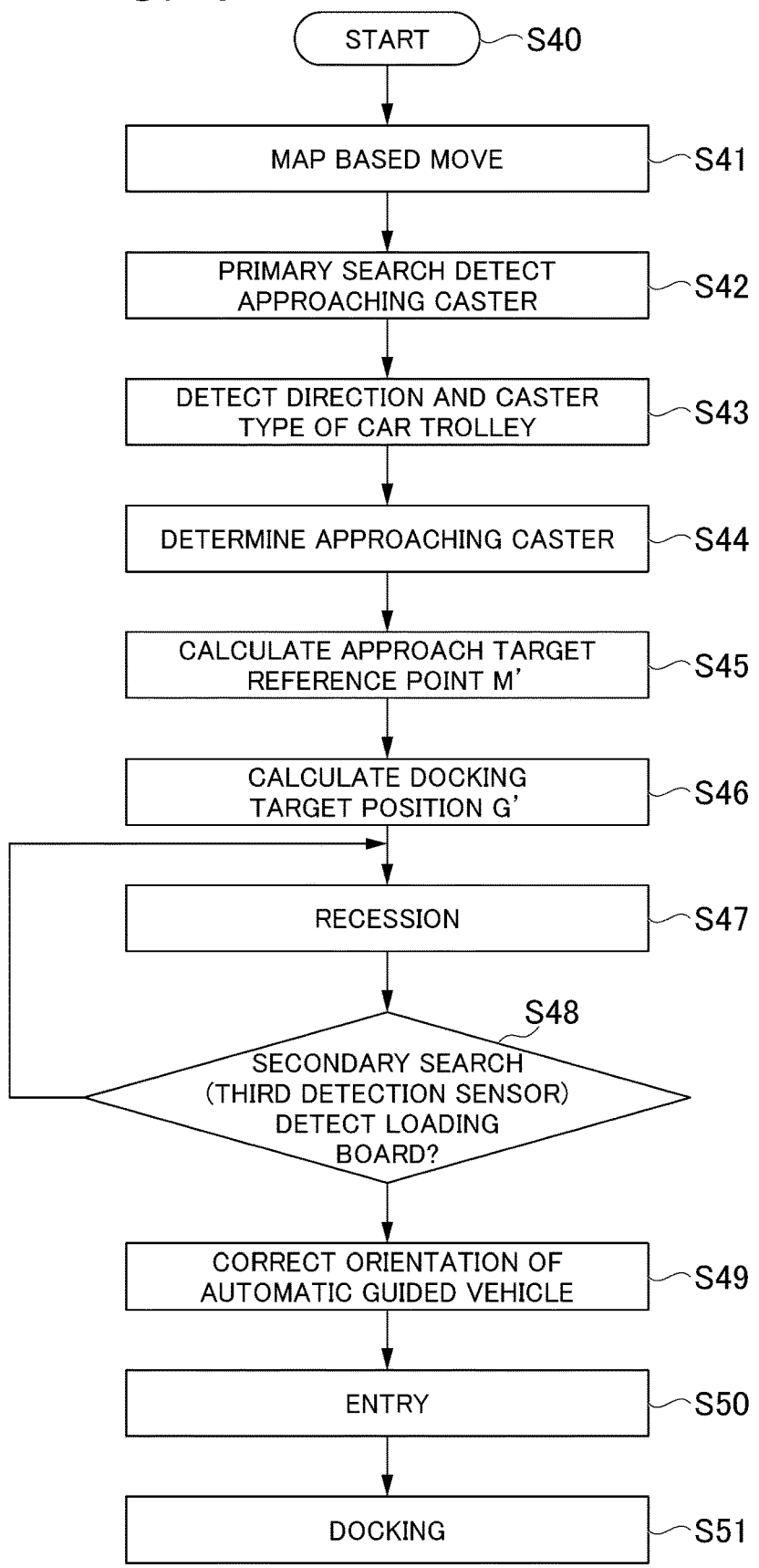
FIG. 19 is a diagram showing a control flowchart of a control device in an unmanned transport vehicle according to the fourth embodiment.

FIG. 19 is a diagram showing a control flowchart of the control device 220 in the unmanned transport vehicle 250 of the fourth embodiment.

The control device 220 of the unmanned transport vehicle 250 shown in FIG. 18 first executes steps S40 to S42 as shown in FIG. 19. Since steps S40 to S42 in the control flow of the present embodiment are the same as steps S0 to S2 shown in FIG. 4 of the first embodiment, a description thereof will be omitted.

Next, the control device 220 executes steps S43 to S46, and based on the detection result of the first detection sensor 210A (orientation and direction of the approach side caster 103a), the first approach target reference point M' and the first docking target position G' are calculated.

Next, the control device 220 executes step S47.

In step S47, the control device 220 advances the unmanned transport vehicle 250.

The control device 220 brings the unmanned transport vehicle 250 closer to the car carriage 100 by retreating the unmanned transport vehicle 250 toward the first approach target reference point M' in the —X direction in step S47.

Next, the control device 220 executes step S48.

In step S48, the control device 220 executes a secondary search by the third detection sensor 210C. The control device 220 executes a secondary search using the third detection sensor 210C, and detects the edge (approach side end face 101c) of the load plate 101 of the car carriage 100.

At this time, the approximate position of the edge of the load plate 101 can be searched by narrowing down the range to some extent based on the known shape information of the car carriage 100.

Further, in the search for the edge of the load plate 101, the linear detection process may be used for the detection point group information by the third detection sensor 210C.

Next, the control device 220 executes step S49.

In step S49, the control device 220 corrects the orientation of the unmanned transport vehicle 250. The control device 220 calculates a new docking target position G on the sixth straight line L6 perpendicular to the approach side end surface 101c at the midpoint (second approach target reference point M") in the length direction of the approach side end surface 101c of the load plate 101 detected in the previous step S48, and corrects the first docking target position G' calculated based on the caster position in the previous step S46.

Next, the control device 220 executes step S50.

In step S50, the control device 220 further enters the unmanned transport vehicle 250 into the bottom space K (FIGS. 1 and 3) under the car carriage 100. In step S50, the control device 220 further retracts the unmanned transport vehicle 250 in the —X direction to enter under the car carriage 100 and moves it to the docking target position G.

Next, the control device 220 executes step S51.

In step S51, the control device 220 executes the docking operation of the unmanned transport vehicle 250 with respect to the car carriage 100.

As described above, according to the unmanned transport vehicle 250 in the present embodiment, the docking target position G can be corrected before the unmanned transport vehicle 250 is brought under the car carriage 100, so that the traveling direction of the unmanned transport vehicle 250 can be corrected with a smaller movement. As a result, the unmanned transport vehicle 250 can be made to go straight to the ideal docking target position G, and the docking efficiency to the car carriage 100 is improved.

When the floor surface F and the orientation of the unmanned transport vehicle 250 before approaching are ideally adjusted, the primary search (step S42) by the first detection sensor 210A and the operation based on this (step S43 to S43). S46) may be omitted, and the secondary search by the third detection sensor 210C may be executed.

Further, the installation position of the third detection sensor 210C is not limited to the position shown in the figure. Any other location may be used as long as it can satisfactorily detect the approach-side edge of the load plate 101 of the car carriage 100 to be transported.

Although some embodiments of the present invention have been described, these embodiments are presented as examples and are not intended to limit the scope of the invention. These embodiments can be implemented in various other forms, and various omissions, replacements, and changes can be made without departing from the gist of the invention. These embodiments and modifications thereof are included in the scope and gist of the invention, as well as in the scope of the invention described in the claims and the equivalent scope thereof.

For example, in each of the above-described embodiments, the car carriage has been described as an example of the object to be transported, but the object to be transported by the unmanned transport vehicle is not limited to the car carriage. For example, a luggage rack composed of columnar support legs may be an object to be transported. In this case, since the orientations of the support legs on the approach side do not change with each other, the approach target reference point M and the docking target position G calculated based on the positions of the support legs on the approach side become an ideal approach target reference point M and an ideal docking target position G.

Further, the approach direction (long side side, short side side) of the unmanned transport vehicle with respect to the object to be transported may be appropriately set according to the structure of the object to be transported, the loading state of the cargo, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A robot configured to transport an object, the object including a load plate to load luggage and a plurality of support legs that support at least four corners of the load plate, the robot vehicle including a moving body configured to automatically travel on a floor surface and having a docking portion to connect to the object, a first detection sensor configured to detect an approach side support leg, wherein, of the plurality of support legs in the object, a pair of support legs located on a docking side of the moving body are designated as approach side support legs, and a pair of support legs located on a side opposite to a docking side in a traveling direction of the moving body is used as depth side support legs, and a control device connected to the moving body and to the first detection sensor of the detection sensor, wherein the moving body has a height allowing the moving body to enter a bottom space surrounded by a lower surface of the load plate of the object, the plurality of support legs, and the floor surface, wherein the robot performs:

searching, by the first detection sensor, for the approach side support leg of the object;

detecting, based on a search result of the first detection sensor, positions of the pair of approach side support legs on the object, and calculating an approach target reference point, which is a target of an approach position to the object, and a docking target position, which is a target of a docking position with respect to the object;

stepwise moving the moving body from the calculated approach target reference point to the calculated docking target position; and docking the robot with respect to the object.

2. The robot according to claim 1, wherein the moving body includes a second detection sensor configured to detect the approach side support leg and a depth side support leg, of the depth side support legs, of the object, and the second detection sensor is provided on one side in a width direction intersecting the traveling direction of the moving body.

3. The robot according to claim 1, wherein the first detection sensor is installed at a height at which a position of each detection surface is higher than the floor surface and lower than the lower surface of the load plate of the object.

4. The robot according to claim 1, wherein the moving body includes a third detection sensor configured to detect the load plate, and a position of a detection surface of the third detection sensor is set at a height higher than the lower surface of the load plate and lower than an upper surface of the load plate.

5. The robot according to claim 1, wherein the first detection sensor is a laser range scanner that measures a distance in a space plane by laser scanning.

6. The robot according to claim 1, wherein the moving body is an omnidirectional moving body using a Mecanum wheel.

7. The robot according to claim 1, wherein when calculating the docking target position the robot further performs:

from a plurality of object detection point cloud data detected by the first detection sensor, determining a pair of point cloud clusters closest to the moving body as the pair of approach side support legs, and calculating a midpoint of a first straight line connecting representative positions of the pair of approach side support legs as the approach target reference point, and determining the docking target position in the bottom space on a second straight line orthogonal to the first straight line at the a calculated pproach target reference point.

8. The robot according to claim 1, wherein the robot further performs:

determining whether or not a movement waypoint is required between the robot vehicle and the calculated approach target reference point, based on a positional relationship between the approach target reference point calculated based on a primary search result by the first detection sensor and a current location of the robot; and stepwise moving the object from the movement waypoint to the calculated docking target position via the calculated approach target reference point.

9. The robot according to claim 1, wherein the robot further performs:

calculating a first approach target reference point and a first docking target position based on a primary search result by the first detection sensor;

searching for the approach side support leg and a depth side support leg, of the depth side support legs, of the object on one side in a width direction intersecting a traveling direction of the robot by a second detection sensor;

determining a position of the depth side support leg based on a search result by the second detection sensor and calculating the first approach target reference point and a second docking target position; and correcting an orientation of the moving body based on the calculated second docking target position.

10. The robot according to claim 1, wherein the robot further performs:

calculating a first approach target reference point and the first docking target position based on a primary search result by the first detection sensor;

searching for a depth side support leg, of the depth side support legs, of the object by the first detection sensor;

calculating a second docking target position based on a secondary search result by the first detection sensor; and correcting the orientation of the moving body based on the calculated second docking target position.

11. The robot according to claim 1, wherein the robot further performs:

calculating the first approach target reference point and the first docking target position based on a primary search result by the first detection sensor;

searching for the load plate of the object by a third detection sensor;

calculating a second docking target position based on a secondary search result by the third detection sensor; and correcting an orientation of the moving body based on the calculated second docking target position.

12. A computer-readable storage medium storing a program for causing a control device to execute a process of transporting an object to be transported by a robot configured to transport the object, the object including a load plate to load luggage and a plurality of support legs that support at least four corners of the load plate, the robot including a moving body configured to automatically travel on a floor surface and having a docking portion to connect to the object, a first detection sensor configured to detect an approach side support leg, wherein, of the plurality of support legs in the object, a pair of support legs located on a docking side of the moving body are designated as approach side support legs, and a pair of support legs located on a side opposite to a docking side in a traveling direction of the moving body is used as depth side support legs, and the control device connected to the moving body and to the first detection sensor of the detection sensor, wherein the moving body has a height allowing the moving body to enter a bottom space surrounded by a lower surface of the load plate of the object, the plurality of support legs, and the floor surface, the process comprising:

searching, by the first detection sensor, for the approach side support leg of the object;

detecting positions of the pair of approach side support legs in the object, based on a search result of the first detection sensor;

calculating an approach target reference point, which is a target of an approach position to the object, and a docking target position, which is a target of a docking position with respect to the object;

stepwise moving the moving body from the calculated approach target reference point to the calculated docking target position; and docking the robot with the object.

13. A control device for transporting an object to be transported by a robot, configured to transport the object, the object including a load plate to load luggage and a plurality of support legs that support at least four corners of the load plate, the robot comprising:
- a moving body configured to automatically travel on a floor surface and having a docking portion to connect to the object;
- a detection sensor configured to detect an approach side support leg, wherein, of the plurality of support legs in the object, a pair of support legs located on a docking side of the moving body are designated as approach side support legs, and a pair of support legs located on a side opposite to a docking side in a traveling direction of the moving body is used as depth side support legs; and
- the control device connected to the moving body and the detection sensor,
- wherein the moving body has a height allowing the moving body to enter a bottom space surrounded by a lower surface of the load plate of the object, the plurality of support legs, and the floor surface, and the control device is configured to:
- search for the approach side support leg of the object by the detection sensor;
- detect, based on a search result by the detection sensor, positions of the pair of approach side support legs on the object, calculate an approach target reference point, which is a target of an approach position to the object, and a docking target position, which is a target of a docking position with respect to the object;
- stepwise move the moving body from the calculated approach target reference point to the calculated docking target position; and
- dock the robot with respect to the object.

* * * * *